United States Patent
Rockwell et al.

[11] 3,738,711
[45] June 12, 1973

[54] ANTI-SKID BRAKE SYSTEM

[76] Inventors: Edward A. Rockwell, 167 Ashdale Place, Los Angeles; Harvison C. Holland, 230 22nd St., Santa Monica, both of Calif.

[22] Filed: Oct. 26, 1970

[21] Appl. No.: 83,732

[52] U.S. Cl. ...... 303/21 A, 188/181 A, 303/21 CG, 303/21 F
[51] Int. Cl. ............................................. B60t 8/12
[58] Field of Search ............... 60/54.5 P, 54.5 HA, 60/54.6 P, 54.6 HA; 91/33; 188/181; 303/6, 20, 21, 22

[56] References Cited
UNITED STATES PATENTS

| | | | |
|---|---|---|---|
| 3,556,608 | 1/1971 | MacDuff et al. | 303/21 F |
| 3,433,536 | 3/1969 | Skinner | 303/21 A |
| 3,588,188 | 6/1971 | Shattock | 303/21 CG |
| 3,532,393 | 10/1970 | Riordan | 303/21 BE |
| 3,415,577 | 12/1968 | Walker | 303/21 F |
| 3,449,019 | 6/1969 | Walker | 303/21 F |
| 3,479,094 | 11/1969 | Chouings | 303/21 A X |
| 3,547,499 | 12/1970 | Maskery | 303/21 P |
| 3,578,820 | 5/1971 | Riordan | 303/21 F |
| 3,586,388 | 6/1971 | Stelzer | 303/21 F |

Primary Examiner—Milton Buchler
Assistant Examiner—Stephen G. Kunin
Attorney—Wolfe, Hubbard, Leydig, Voit & Osann

[57] ABSTRACT

A power braking system is disclosed for vehicles producing a maximum stopping force for any given road condition while preventing the vehicle from skidding. A pressure proportioning device varies the ratio of pressures between the front and rear brake lines of the vehicle as braking increases to achieve maximum stopping force for any given road condition at both the front and rear wheels. When increasing brake line pressure produces braking forces which exceed the maximum achievable stopping forces as determined by tireroad coefficient of friction, and the wheels start to lock-up, the resulting reduction in deceleration is detected by deceleration responsive control apparatus which operates the power booster of the power brake system to momentarily reduce the brake line pressures both front and rear which allows the wheels of the vehicle to resume turning, and then reapplies the brake line pressure, the cycle being repeated. The attendant result is the modulation of the braking force about the maximum for both front and rear wheels at the same time.

17 Claims, 21 Drawing Figures

INVENTORS.
EDWARD A. ROCKWELL
HARVISON C. HOLLAND

BY
Wolfe, Hubbard, Leydig, Voit & Osann
ATTORNEYS.

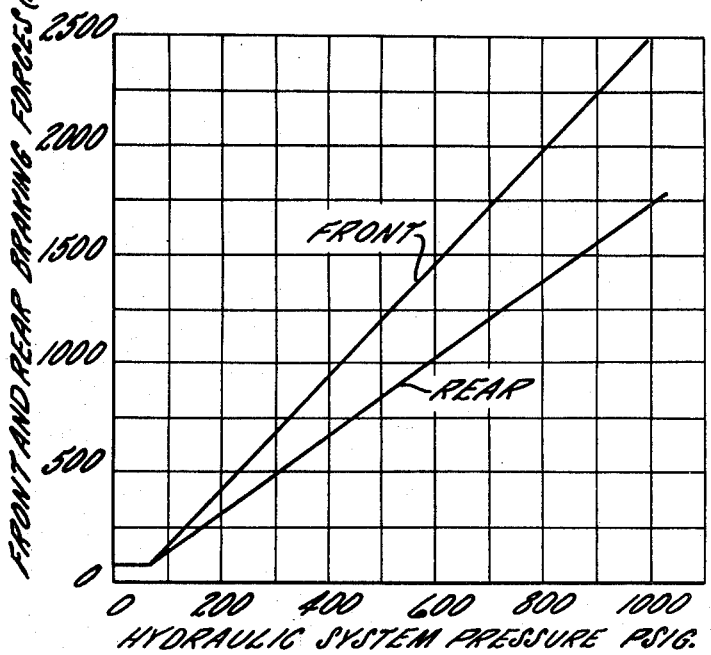
fig. 4.
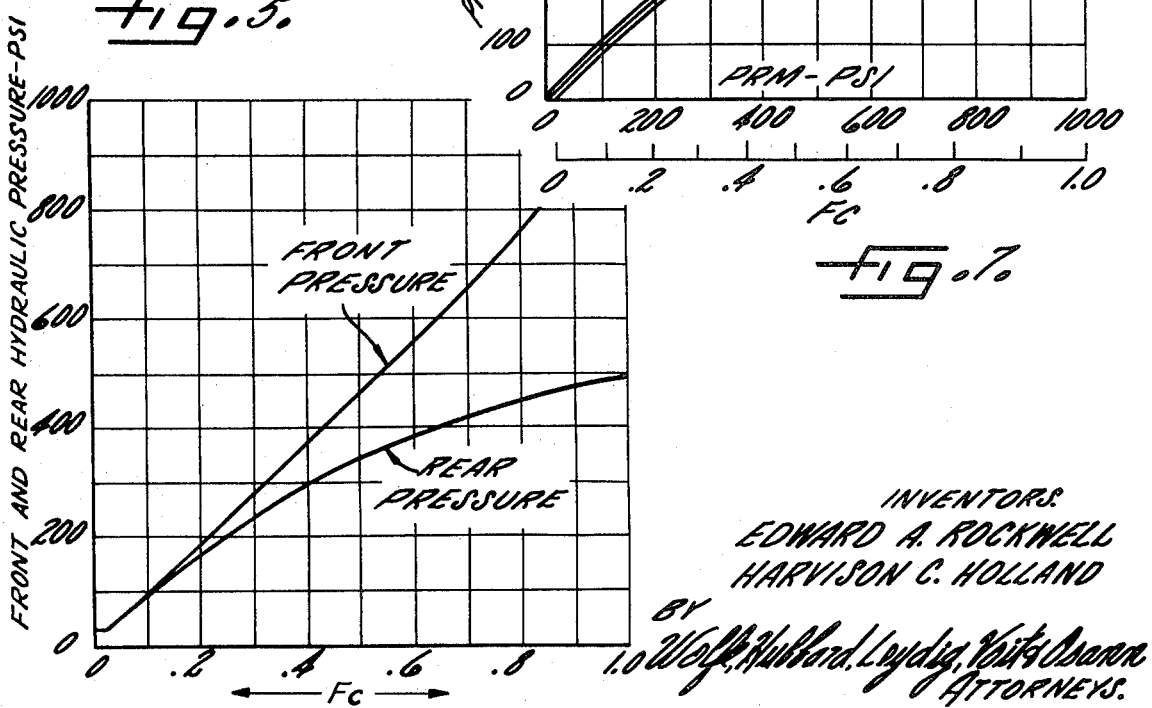
fig. 5.
fig. 7.
INVENTORS.
EDWARD A. ROCKWELL
HARVISON C. HOLLAND
BY
Wolf, Hubbard, Leydig, Voit & Osann
ATTORNEYS.

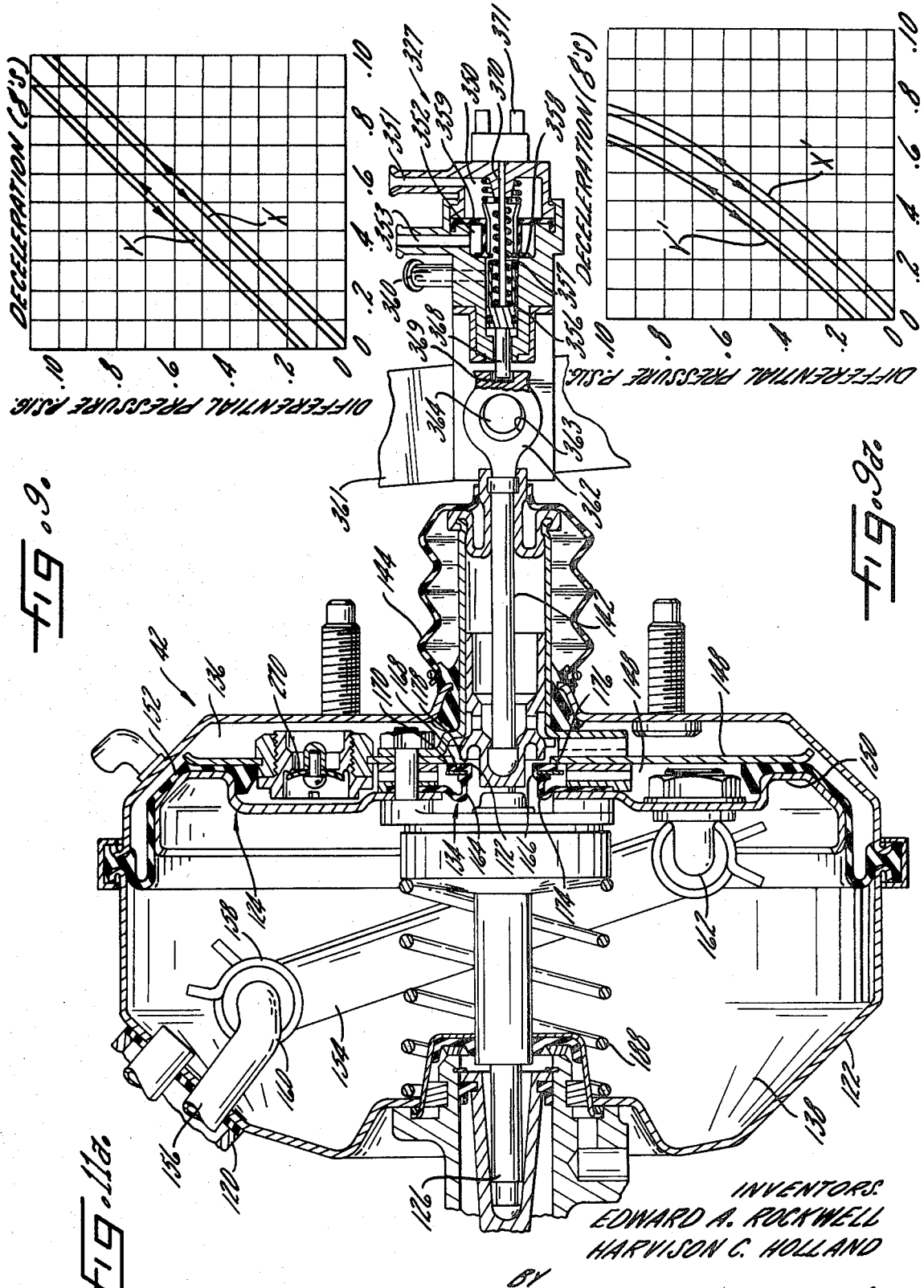

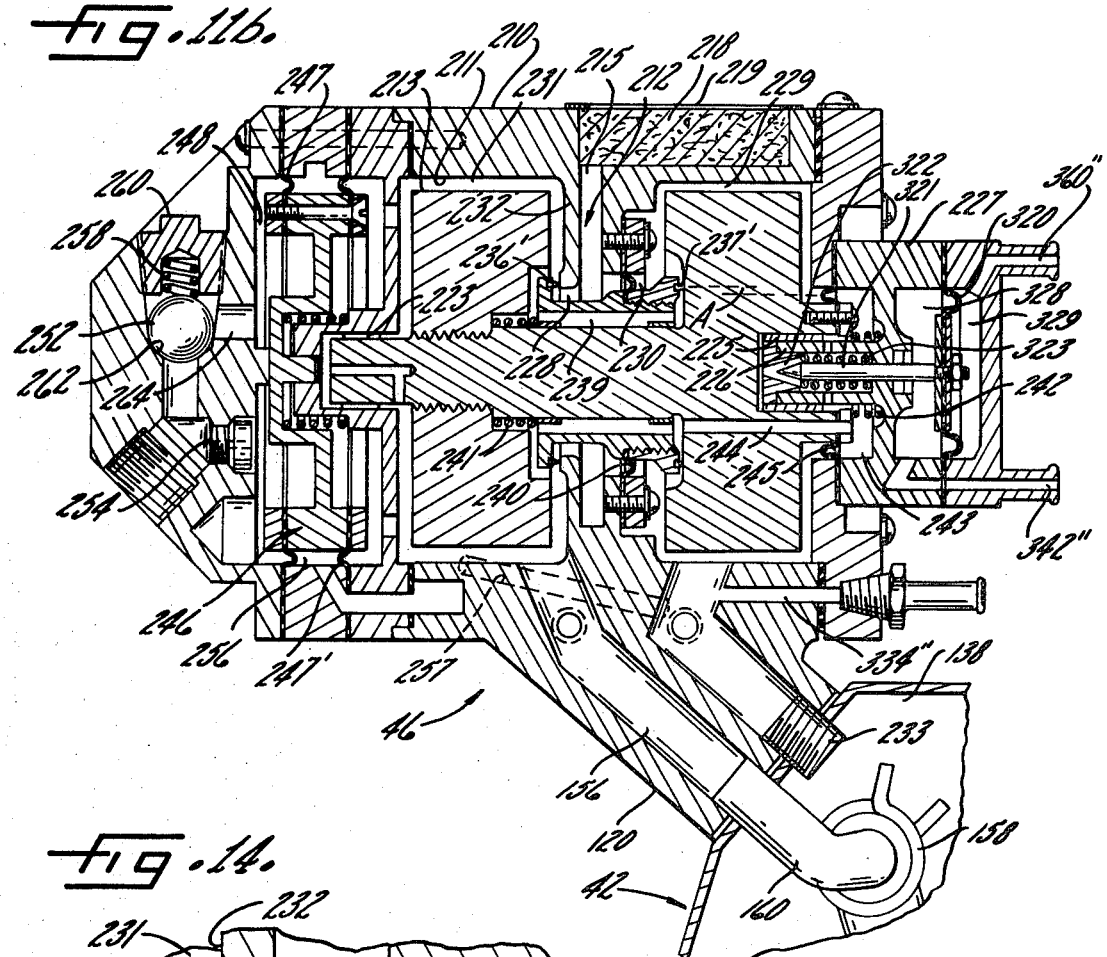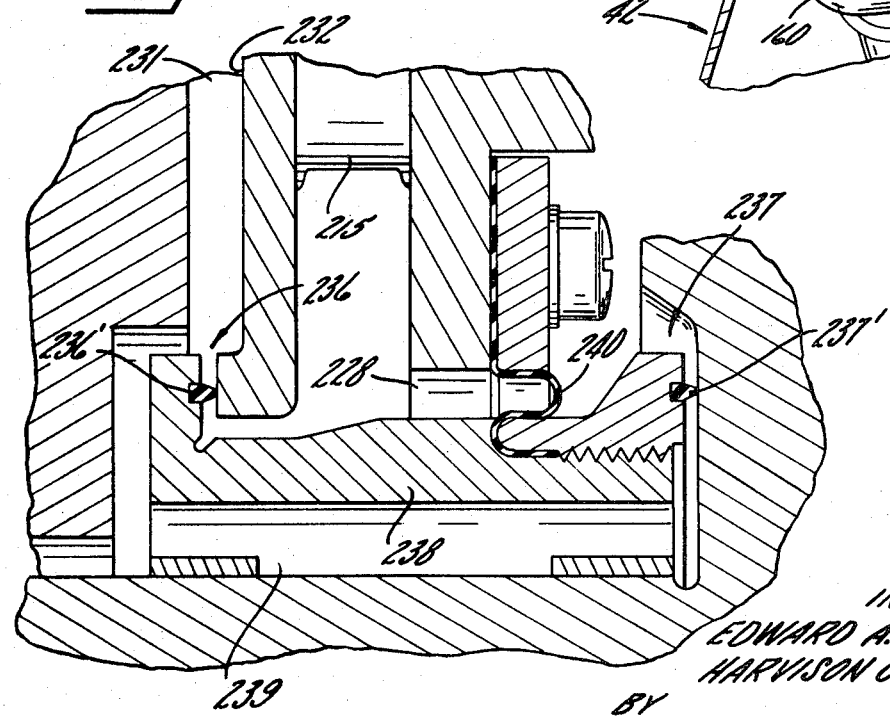

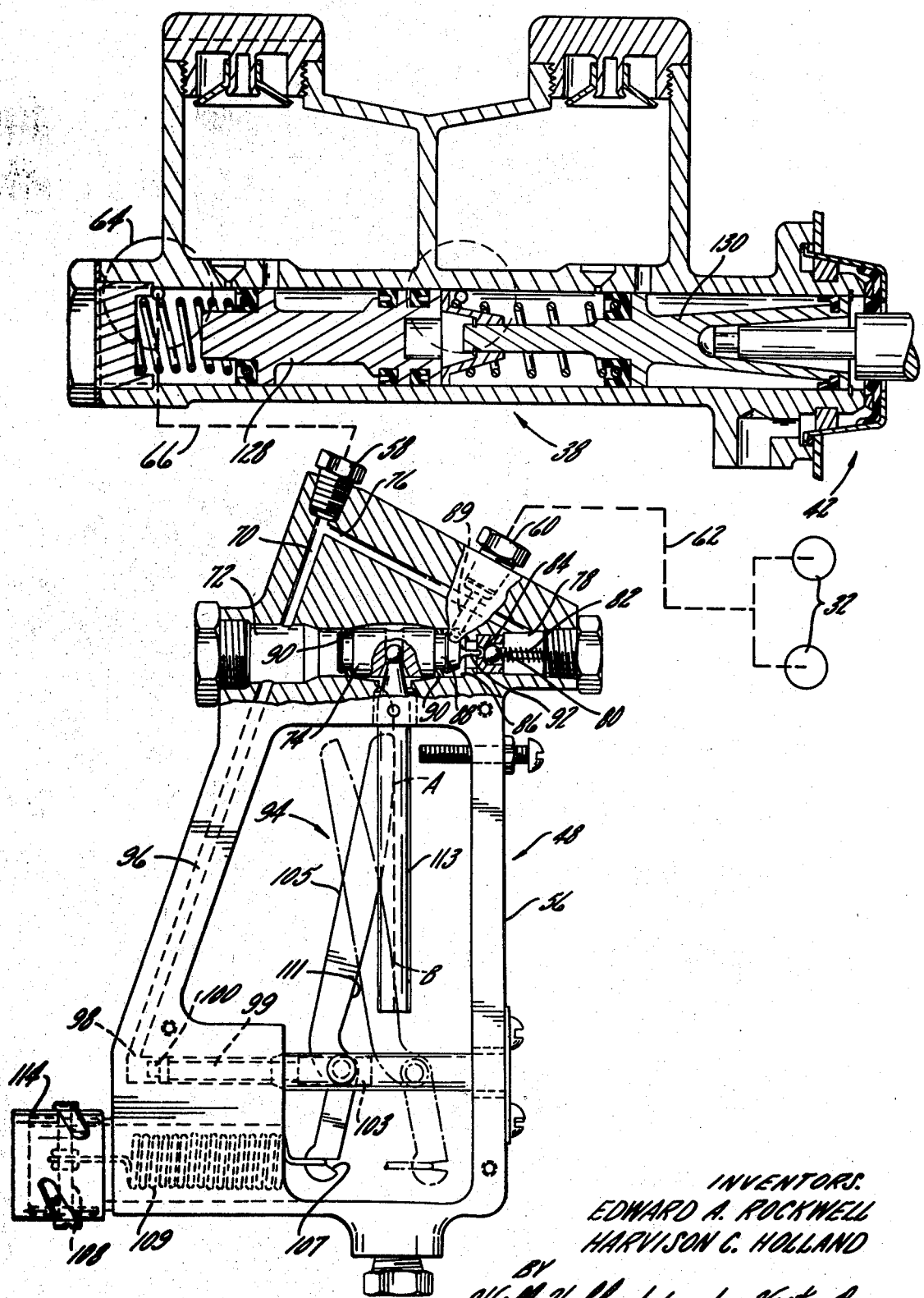

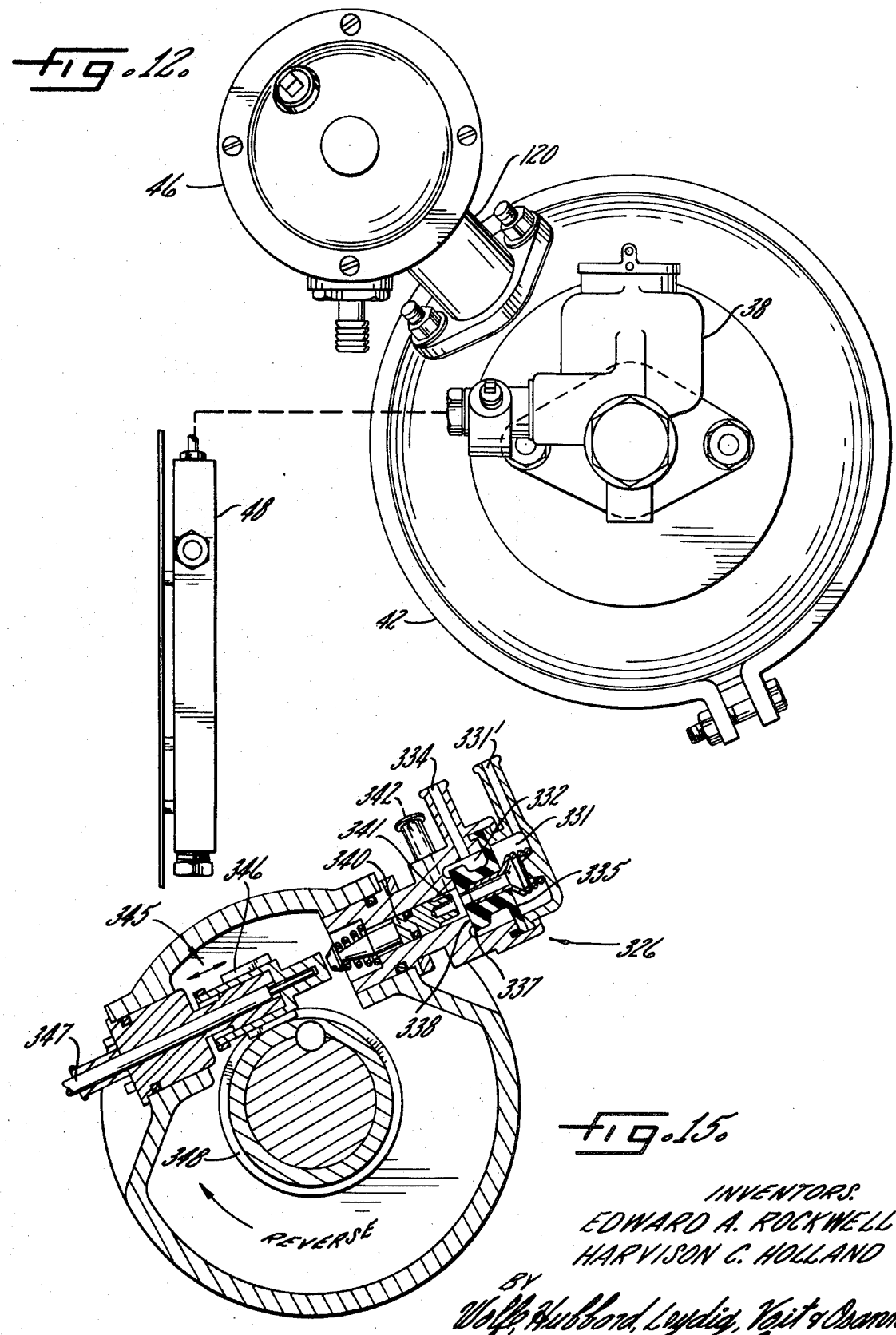

INVENTORS.
EDWARD A. ROCKWELL
HARVISON C. HOLLAND
BY
Wolff, Hubbard, Leydig, Voit & Osann
ATTORNEYS.

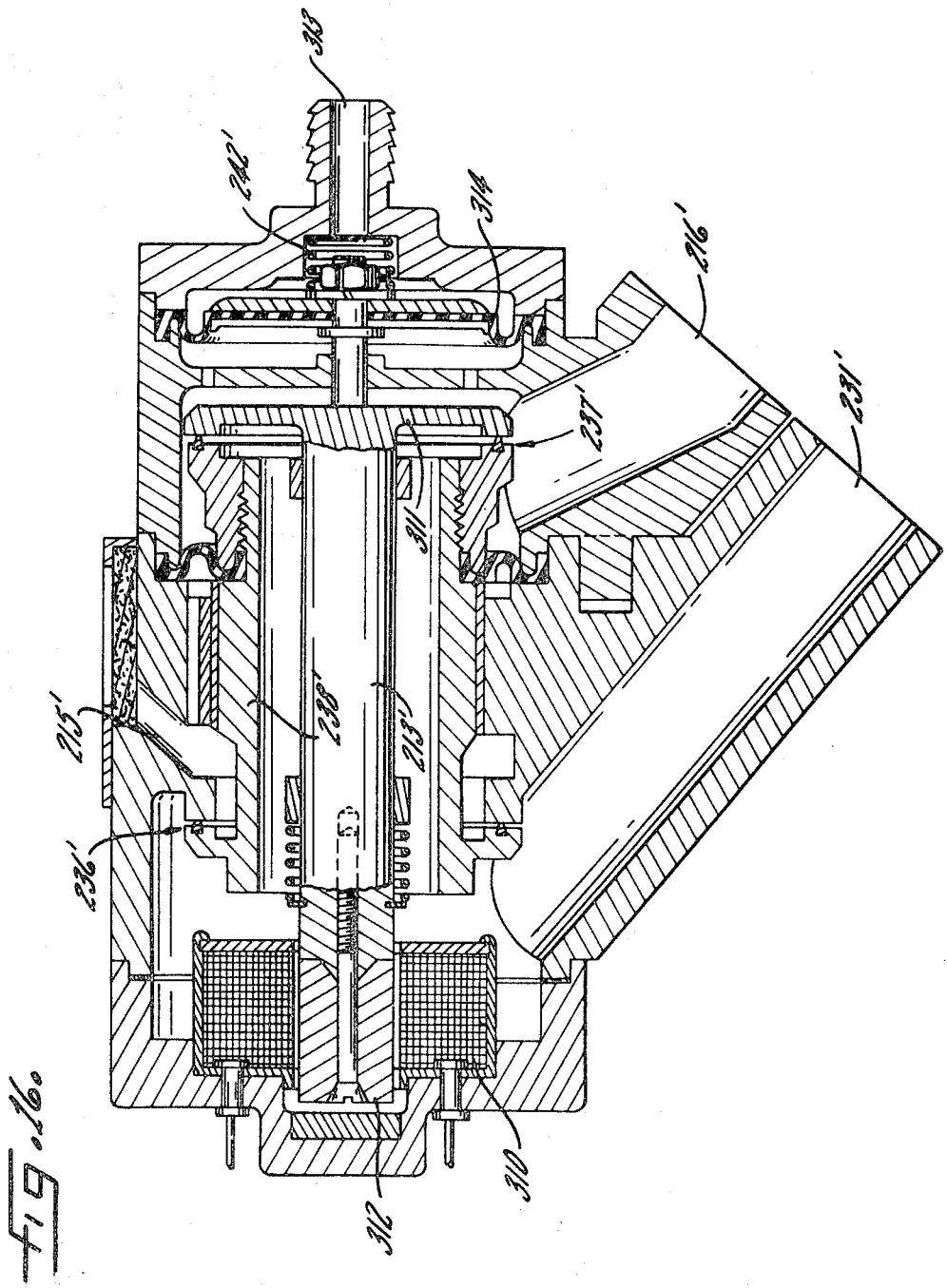

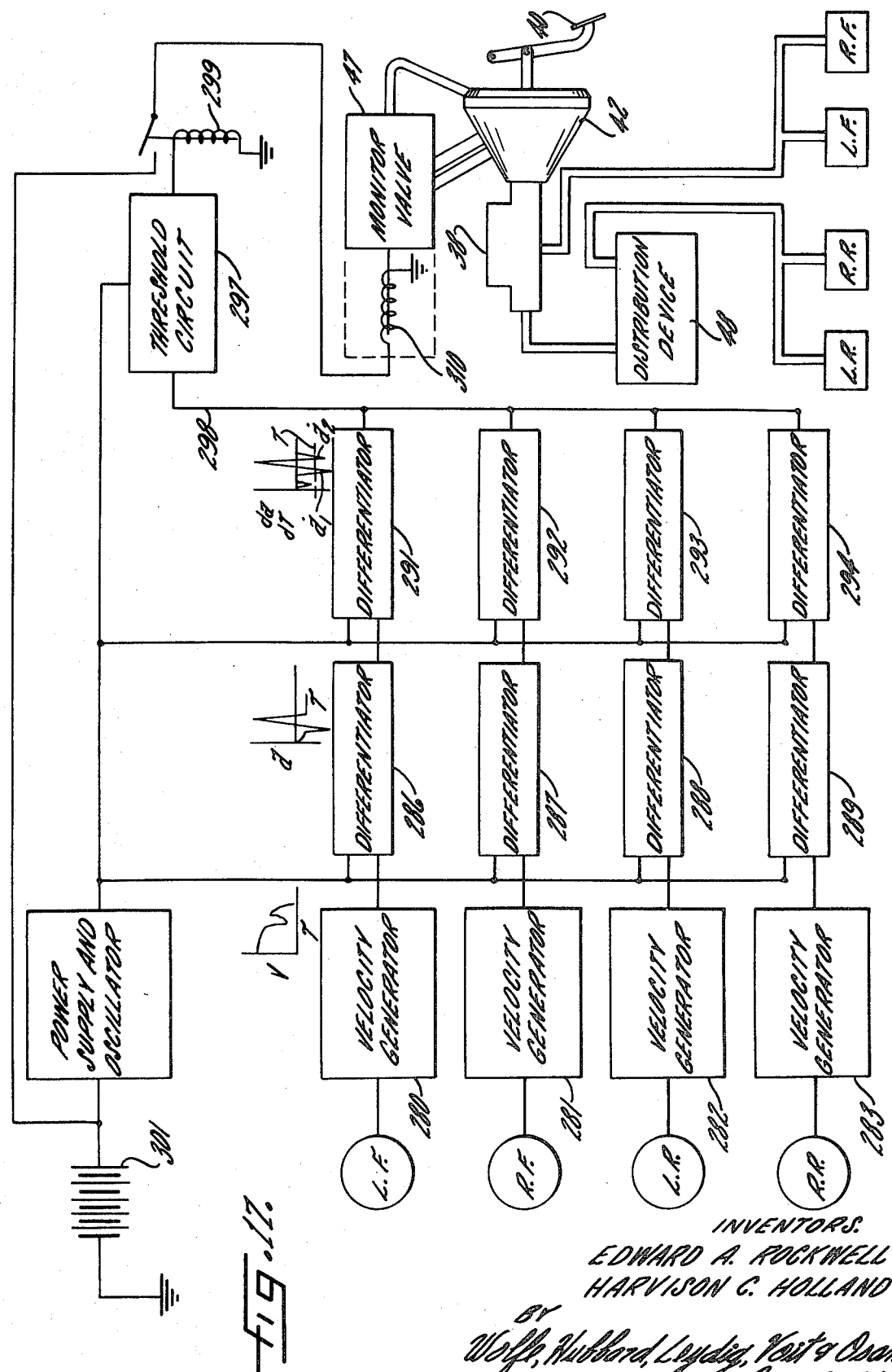

ANTI-SKID BRAKE SYSTEM

BACKGROUND OF THE INVENTION

This application is related to copending applications of Harvison C. Holland, Ser. Nos. 708,880, filed Feb. 28, 1968, now U.S. Pat. No. 3,642,328 issued Feb. 15, 1972 entitled "Method for Producing Maximum Vehicle Deceleration" and 54,206, filed July 13, 1970, entitled "Variable Ratio Proportioning Device", and the copending application of Edward A. Rockwell, Ser. No. 168,683, entitled "Declerometer Skid Control System Components", filed Aug. 3, 1971.

The present invention is directed to vehicle power braking systems in general, and, in particular, to anti-skid braking systems for automotive vehicles.

Numerous automotive anti-skid braking systems have been devised in the past. In one type of system, a group of speed sensors are employed to detect the skid condition at each of the wheels, or at each pair of wheels of the automobile, and to modulate the braking system pressure or each wheel pair pressure of the braking fluid in response thereto. In that type of system the dual master cylinder which is also conventionally utilized, establishes fixed proportioning between front and rear brake line pressure. Valves are also sometimes utilized to vary the ratio of front to rear brake line pressures, but these devices typically provide a substantially fixed ratio, several fixed ratios, over the range of operation of the unit or segments of variable ratios.

However, an inherent problem associated with these types of braking systems is caused by the fact the ratios of braking effect do not account for the wide variation in achievable tire-road coefficient of friction due to different road conditions, and typically provide optimum ratio of braking effect for only one or two conditions of tire-road coefficient of friction for a particular vehicle configuration.

For example, under icy or glazed low tire-road coefficient of friction conditions, the maximum achievable braking effect and the weight shift to the front wheels at maximum braking will be low, and the front wheels will usually start to skid long before the rear wheels begin to skid and thus before the maximum stopping force is achieved even for such poor braking conditions. Under dry road high tire-road coefficient of friction conditions, on the other hand, the maximum achievable braking effect and the weight shift to the front wheels at maximum braking will be high, and the rear wheels will usually start to skid before the front wheels start to skid.

If the breaking pressure for all four wheels or for a pair of wheels is reduced when the sensors at only one wheel or pair of wheels detects skidding, maximum stopping force from the entire automobile brake system will never be achieved. Moreover, with those systems which detect skidding and control pressure for one pair of wheels, under certain road conditions the other pair of wheels may start to skid first, and the anti-skid system may never begin to operate before the driver loses control of the vehicle. With a conventional automobile having four wheels, with brakes at front and rear, according to the concept explained in copending application of Harvison C. Holland, Ser. No. 708,880, now U.S. Pat. No. 3,642,378 entitled "Method for Producing Maximum Vehicle Deceleration", for each distribution of disposable load there is only one optimum ratio of braking froces between front and rear for a given coefficient of friction between the tires and the road that will provide maximum deceleration. This is a fundamental relationship based upon the configuration of the vehicle and its braking system.

This relationship of stopping forces takes into consideration the weight-transfer effect during braking which tends to increase the downward force at the front wheels and lessen the force at the rear wheels even though the total downward force of the vehicle on its wheels is the same as when standing still. Since the maximum stopping force obtainable from a given wheel is equal to the downward force on the wheel times the coefficient of friction between the tire and the road, it can be seen that the front wheels can provide a greater proportion of the total stopping force, and the rear wheels a lesser proportion as the maximum adhesion obtainable between the tires and the road increases.

According to the invention described in copending application of Harvison C. Holland, Ser. No. 54,206, filed July 13, 1970 for Variable Ratio Proportioning Device, the stopping force relationship described above may be obtained with the conventional hydraulic brake system by including a proportioning device shown as a valve connected in the brake lines. This proportioning device is supplied with high pressure fluid from the master cylinder of the brake system, and transmits fluid at regulated pressure to the rear wheel brakes. According to that invention, the fluid pressure in the brake lines to the rear brakes is varied according to a predetermined function of the brake line pressure supplied from the master cylinder, so as to vary the braking effect between front and rear wheels as vehicle deceleration changes. The device is effective to vary the ratio of the brake line pressures between the front and rear brake lines as a non-linear function of vehicle deceleration, to obtain the stopping force relationship derived by Harvison C. Holland and takes into account the weight and center of gravity characteristics of the vehicle, and the braking characteristics of the wheel brake mechanism with which the vehicle is equipped, in order to obtain optimum proportioning of braking force for maximum braking under all road conditions.

With a braking system having such a variable proportioning device but without skid detection and control, since the front and rear wheels both reach the point of maximum braking at the same time, it is clear that both the front and rear wheels will begin to skid substantially simultaneously at a point when the braking force applied to the wheels as a result of increased pressures in the brake lines exceeds the maximum stopping force achievable under the given tire-road friction conditions. It has, furthermore, been observed that the impending skid condition of the automobile caused by the start of wheel lock-up will be reflected in a reduction in the rate at which the automobile decelerates.

DESCRIPTION OF THE INVENTION

The present invention relates to an automotive brake system which incorporates control of braking effort to obtain maximum stopping force by utilizing the Holland concept of variable proportioning, and further incorporates impending wheel skid detection and control of braking effort to prevent wheel skidding when the braking force exceeds the maximum achievable stopping force under prevailing tire-road conditions.

More specifically, the present invention relates to an automotive brake system which incorporates variable proportioning to vary the ratio of the brake line pressure between the front and rear brake lines as a non-linear function of deceleration to obtain minimum stopping distances under any road condition, and further incorporates detection of impending skidding by detecting deceleration of the vehicle and responsive to a change of deceleration, reducing the braking force on all four wheels below the level which will cause wheel lock-up, to prevent skidding.

Without variable proportioning of brake line pressures between rear and front brake lines provided for in the system, reducing braking force to prevent skidding responsive to deceleration changes of the vehicle itself would not allow optimum braking since such changes in deceleration would occur upon skidding of either front or rear wheels, whichever occurs first, and thus prematurely stop the skid. With provision in the system for variable proportioning between front and rear brakes, detection of the deceleration changes due to skidding comes at the exact point when maximum stopping force has been achieved.

It is, therefore, an object of the present invention to provide an anti-skid braking system for automobiles which applies the maximum braking forces that the tires are capable of exerting on the roadway on both the front and rear wheels before the anti-skid brake releasing function comes into action regardless of the conditions of the road.

A related object is to provide for maximum deceleration of the vehicle under all conditions of loading and road surface.

It is another object of the present invention to provide a braking system in which the braking forces are modulated about their maximum at both front and rear wheels in order to maintain maximum deceleration without skidding. Another object is to provide an anti-skid braking system which not only relieves the braking forces to the wheels momentarily and repeatedly as skidding begins, but also warns the operator by an increase in pedal pressure that this dangerous condition is imminent.

It is another object of the present invention to provide an anti-skid braking system in which the stopping forces at the front and rear wheels of the vehicle provide maximum stopping ability at all times and under all conditions.

Another object is to utilize changes in deceleration of the entire vehicle, or alternatively of the wheels of the vehicle, to control the anti-skid function.

Another object is to provide an automotive anti-skid braking system which involves the addition of components to the conventional braking systems now in use and which does not impair the simplicity and reliability of operation of the components of the original hydraulic systems by the addition of variable distribution and anti-skid features.

A related object is the provision of a braking system which is inherently safer than those presently available. Another object is to provide a braking system with variable proportioning and anti-skid braking features which is inherently inexpensive to manufacture, reliable in operation, and capable of being attached to present day automobiles and incorporated in conventional hydraulic brake systems with a minimum of modification to the existing systems.

Another object is to provide anti-skid power braking systems for automotive vehicles. A related object is to prevent automotive vehicle skidding which results from wheel lock-up due to the application of excessive braking force by power braking systems, by detecting impending wheel lock-up and reducing the braking force produced by the power braking system in response thereto.

Another object is to control the pressures supplied to operate the power booster of an automotive power braking system, for anti-skid purposes.

An object is to control a power booster of an automotive power brake system according to the rate of deceleration of the vehicle or its wheels, for anti-skid purposes. More specifically, an object is to control the differential pressure operating the power booster power wall in response to changes in deceleration indicating skid to momentarily reduce the braking force and then increase the braking force and thereby modulate the braking force about the skid point, thus controlling the power force developed by the booster.

Another object is to provide a vacuum suspended power booster for automotive braking system which is adapted to be operated by two sources of pressure, one source supplying a substantially constant sub-atmospheric pressure approximately the engine manifold vacuum pressure, and the other source supplying air at a variable absolute pressure. Another object of the invention is to control the power force developed by the booster by varying the differential pressure 7 operating the booster power wall as a function of acceleration of the vehicle, in order to prevent wheel lock-up and vehicle skidding.

A further object is to control the flow of pressure fluid supplied to operate a servomechanism so as to prevent excessive rate of application of the servomechanism. More specifically, as applied to a vacuum suspended power booster, for example, an object of the invention is to control the flow of air supplied to operate the movable power wall of the booster.

Other objects will become evident from the following description taken in connection with the accompanying drawings in which:

FIG. 1 is a schematic representation of a vehicle during deceleration;

FAIG. 2 is a graph of the ratio $S_f/S_r$ plotted against various coefficients of friction $F_c$ between the tires and the road for an exemplary vehicle;

FIG. 4 is a graph also illustrating two curves, front and rear braking force, respectively, plotted against hydraulic system pressure;

FIG. 5 is a graph also illustrating two curves, front brake system pressure and rear brake system pressures, respectively, plotted against $F_c$;

FIG. 7 is a graph illustrating design curves for the proportioning device;

FIGS. 9–9a are graphs showing two pressure curves plotted against deceleration, one for the decelerometer and one for the power booster;

Figure 10:
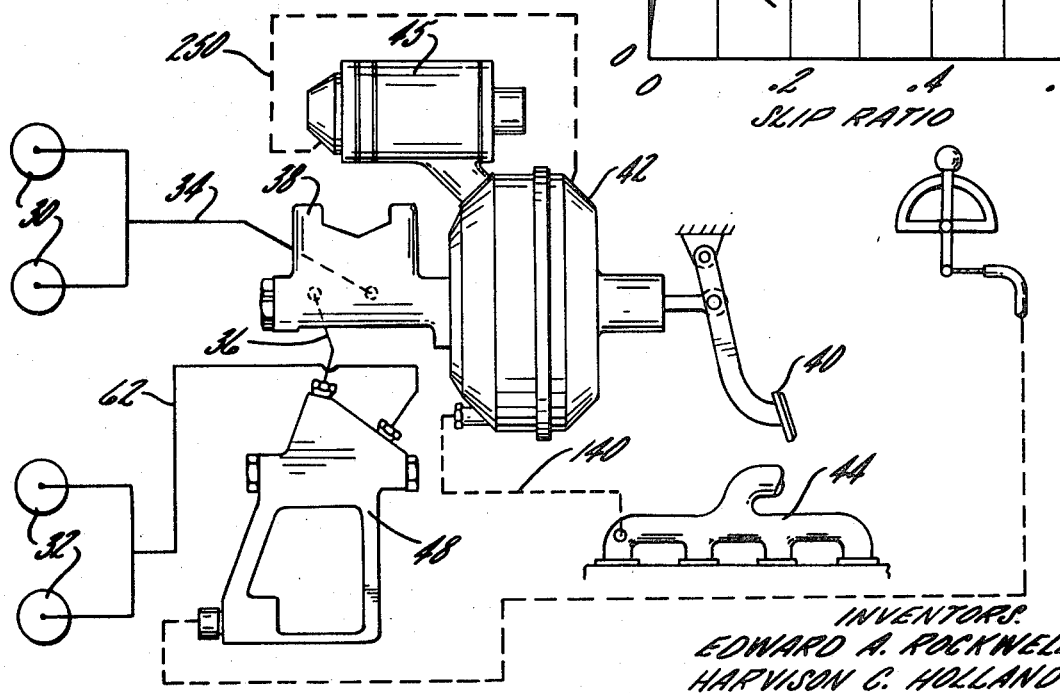
FIG. 10 is a schematic view of an anti-skid system constructed in accordance with this invention.
Figure 13:
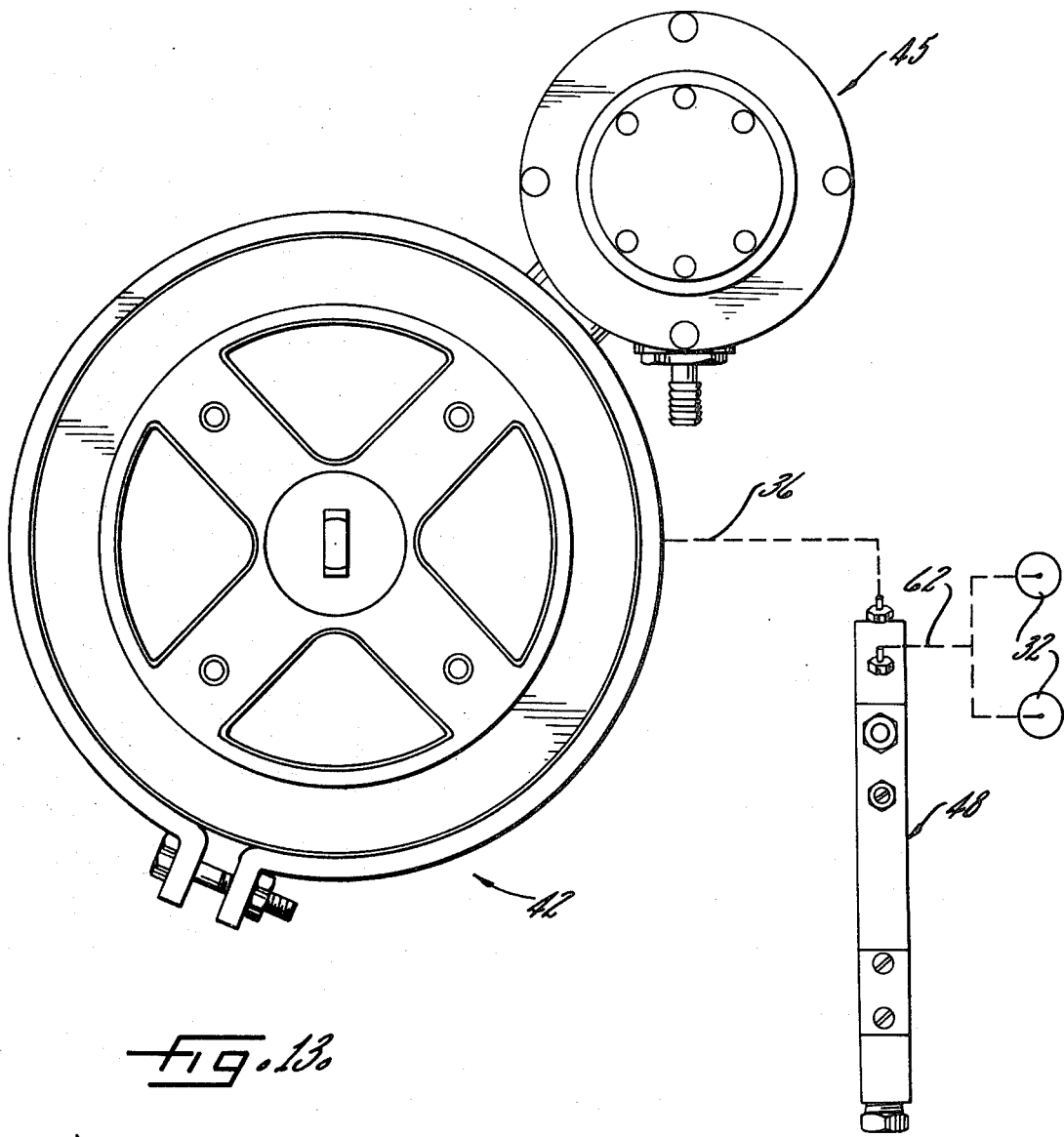
Figure 18:
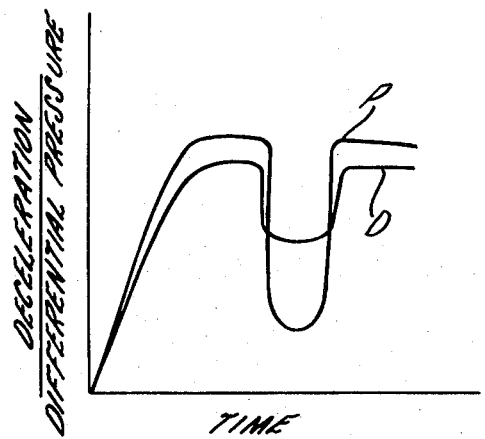

FIGS. 11A, 11B and 11C taken together are an enlarged cross-sectional view with portions shown in elevation of the power booster, decelerometer, master cylinder, and proportioning device components incorporated in the anti-skid system shown in FIG. 10 schematically;

FIG. 12 is a front view of the components shown substantially in FIG. 10 taken from the left of that Figure;

FIG. 13 is a rear view of the components shown substantially in FIG. 10 taken from the right in that Figure;

FIG. 14 is an enlarged fragmentary view of the three-way valve included in the decelerometer shown in cross-section in FIG. 11b;

FIG. 15 is an enlarged fragmentary view showing a speedometer cable take-off mechanism and pressure control valve associated with the decelerometer shown in FIG. 11b;

FIG. 16 is an enlarged cross-sectional view of the electronically controlled monitor valve;

FIG. 17 is a schematic view of the anti-skid system and illustrating the electronically controlled monitor valve; and FIG. 18 is a graph of deceleration and supply pressure plotted against time for the decelerometer.

THE SYSTEM IN GENERAL

Now turning to the drawings, FIGS. 1–10 are schematic illustrations and graphs to assist in the explanation which will be given of the Holland method of producing maximum vehicle deceleration, which method has been followed in the development of the anti-skid braking system constructed according to this invention and schematically shown in FIG. 10.

In general, by following the Holland method, a brake system has been devised which varies the proportioning of braking forces front to rear in a manner determined by the configuration of the particular vehicle on which the system is used, so as to match the requirements for that vehicle to produce maximum deceleration under any given road conditions. Since with a braking system having such variable proportioning, the front and rear wheels both reach their maximum stopping force at the same time, both the front and rear wheels will begin to skid simultaneously at a point when the braking force applied to the wheels through the brake system exceeds the maximum stopping force that can be developed at the road surface under the prevailing coefficient of friction conditions. It has been observed that the impending skid caused by the start of wheel lock-up when the tires break free of the road surface will be reflected in a change of the rate at which the vehicle decelerates. According to this invention, a deceleration responsive control means responsive to the rate of deceleration of the vehicle, or its wheels, is utilized to modulate the total braking forces applied by the system about their maximum points at both front and rear wheels to maintain maximum vehicle deceleration without skidding.

Provision for non-skid maximum braking according to this invention is schematically shown embodied in a hydraulic brake system for an automobile in FIG. 10. The hydraulic brake system includes the conventional elements of front and rear brakes 30 32, separate front and rear brake lines or sub-systems 34, 36 and a dual master cylinder 38 producing front and rear brake line pressures in response to application of the brake pedal 40 by the operator.

In addition, the brake system includes certain unique elements. A power booster 42 is operated by the brake pedal 40 and provides power assist to operate the dual master cylinder 38. This power booster is unique in that it is a vacuum suspended unit the power wall of which is operated by a deceleration responsive means 45 operating independently of and in conjunction with the booster control valve.

Another unique element included in the system is the deceleration responsive control means 45 which is operable to control the differential pressure supplied to operate the power wall of the booster to apply the brakes and decelerate the vehicle, and which is further responsive to changes in deceleration reflecting an impending skid to operate the booster to reduce the braking force on all four wheels below the level which will cause wheel lock-up, to prevent skidding, and then to reapply the booster to reapply the braking force, the cycle being repeated. Furthermore, a proportioning device 48 is included, constructed according to the invention described in copending application of Harvison C. Holland, Ser. No. 54,206, entitled Variable Ratio Proportioning Device, filed July 13, 1970. This device is operable to vary the braking force front to rear produced by the braking system to match the stopping force requirements front to rear established for that particular vehicle by following the method of producing maximum vehicle deceleration described in copending application of Harvison C. Holland, Ser. No. 780,880, entitled Method for Producing Maximum Vehicle Deceleration, filed Feb. 28, 1968 now U.S. Pat. No. 3,642,328.

THE HOLLAND METHOD

The Holland concept as set forth in said application Ser. No. 708,880, now U.S. Pat. No. 3,642,328 is based upon the discovery that for any vehicle having front and rear brakes, there is one (and only one) front to rear stopping force ratio that will produce maximum deceleration at each coefficient of friction between the tires and the road. This is a fundamental relationship and takes the form of the following equation:

$$S_f/S_r = (Y + F_c Z)/(X - F_c Z)$$

where $Y$ is the horizontal distance from the rear wheels to the center of gravity of the vehicle, $X$ is the horizintal distance from th front wheels to the center of gravity, $Z$ is the vertical distance from the road surface to the center of gravity, and $S_f$ and $S_r$ are the stopping forces at the front and rear tires respectively due to tire-road friction, and $F_c$ is the coefficient of friction between the tire and road.

Figure 1:
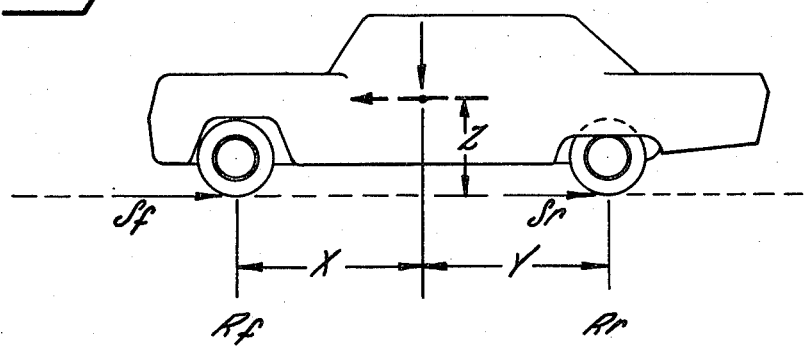

Briefly detailing the concept more fully explained in said application, referring to FIG. 1, the friction between the front and rear tires and the surface of the road enables a vehicle to be braked to a stop by breaking forces applied to the wheels through the braking system. Hereinafter, where the term "stopping force" is used, that term refers to the reaction force applied to the tires by the road surface to stop the vehicle, while the term "braking force" refers to the force applied to the wheels to brake the wheels by the wheel brake mechanism. The stopping force $S_f$ at the front wheels produced as the vehicle decelerates is equal to the vertical reaction at the front wheels times the coefficient of friction $F_c$. Thus $S_f = F_c R_f$. Similarly, the stopping force $S_r$ at the rear wheels equals the product of vertical reaction and the coefficient of friction, so that $S_r = F_c R_r$.

Knowing these relationships and taking a summation of forces and moments about the center of gravity, the Holland equation for $S_f/S_r$ can be derived.

Next, in order that this equation may be utilized, the location of the center of gravity is determined for a given vehicle at a given loading, which may be accomplished as described in said copending application Ser. No. 708,880, now U.S. Pat. No. 3,642,328.

Figure 2:
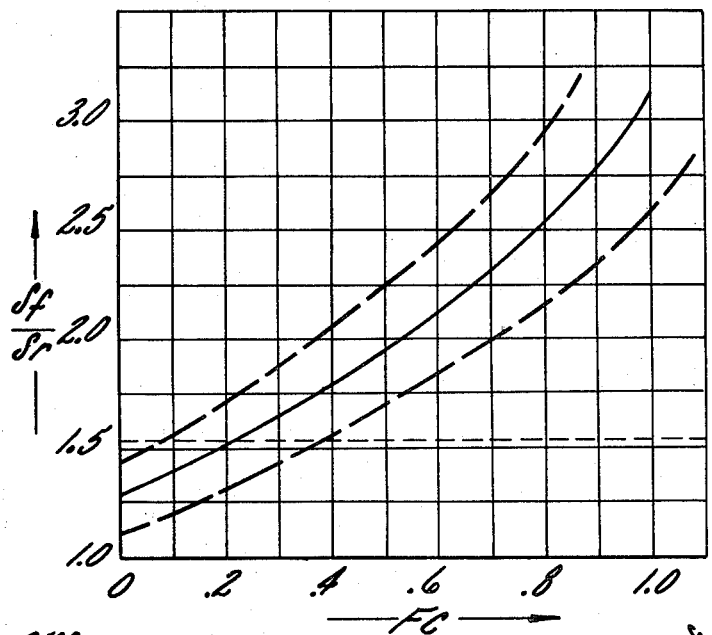

Having determined the distance dimensions $X$, $Y$ and $Z$ of the center of gravity from the wheels and the road surface, a compilation then is made of the ratio of the maximum obtainable stopping force at the front wheels to that at the rear wheels for various coefficients of friction between the tires and road, using the equation for $S_f/S_r$. The coefficients of friction are selected within the range that will be experienced between the tires and the road during operation of the vehicle. Preferably a curve of this information is plotted as illustrated in FIG. 2.

From the equation for $S_f/S_r$, the following additional relationships may be derived, wherein $W$ is the total weight of the vehicle:

$$S_f = \frac{F_o W}{1 + \dfrac{1}{\dfrac{S_f}{S_r}}}$$

and $$S_r = F_c W - S_f$$

Figure 3:
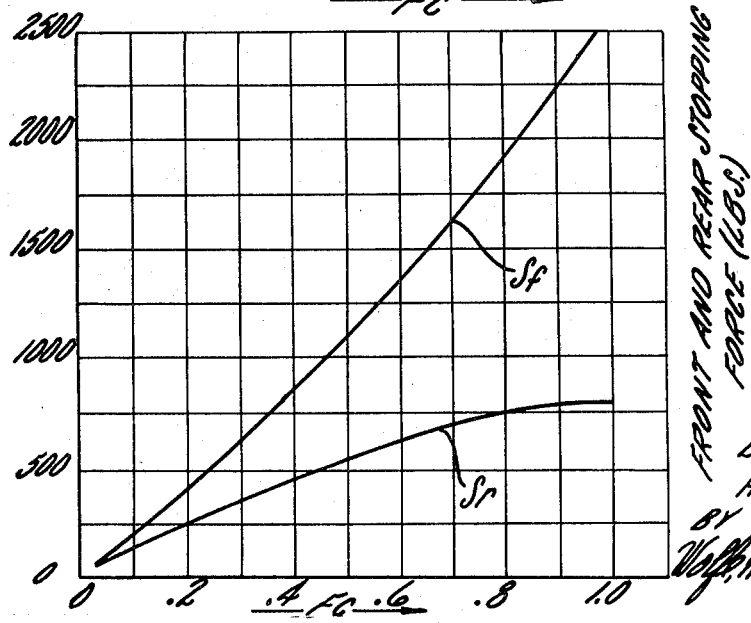
FIG. 3 is a graph showing two curves, one curve represents $S_f$ plotted against $F_c$ and the other curve represents $S_r$ plotted against $F_c$.

With these latter equations, data may be obtained indicating the maximum stopping force obtainable at the front wheels and at the rear wheels as a function of the coefficient of friction of the tires relative to the road. In so doing, values are taken from the curve of FIG. 2 and inserted into the two formulas for $S_f$ and $S_r$ noted immediately above. Again, preferably, curves are drawn for the front and rear wheels as indicated in FIG. 3. This represents the ideal condition, i.e. the highest values of stopping forces front and rear that are possible at various coefficients of friction for the vehicle in question.

With this in mind, actual braking force values at various hydraulic pressures in the breaking system of a particular vehicle are secured through the use of a dynamometer, by rotating the wheels and measuring the resistance to movement produced by the brakes at different hydraulic pressures. A conventional dynamometer may be used for these measurements. Using these readings of the hydraulic system pressure and braking force, curves preferably are plotted as shown in FIG. 4 illustrating the relationship between hydraulic system pressure and actual braking force for the systems for the front and rear wheels of a given vehicle.

To produce maximum vehicle deceleration, according to the Holland method the actual braking forces produced at the front and rear wheels by the hydraulic brake system of the vehicle (which is graphically shown in FIG. 4) should be controlled by means incorporated in the system so that the relationship of braking force front to rear matches the relationship of stopping force front to rear shown in FIG. 2. Ideally, the actual braking force relationship front to rear should be varied to match the variation in stopping force relationship front to rear shown in FIG. 2. Understanding this aspect is the key to understanding the Holland method.

Putting it another way, when the relationship of braking force front to rear is varied to agree with the required stopping force relationship front to rear illustrated in FIG. 2, maximum vehicle deceleration will be produced under any given tire-road coefficient of friction condition by applying braking forces that approach but do not exceed the skid point and thus produce maximum stopping forces concurrently at front and rear for any particular tire-road coefficient of friction condition. With this fact in mind, the next step in the Holland method is to determine how the stopping forces which are required (FIG. 3) can be produced with the given vehicles' hydraulic brake system (FIG. 4). This stop can be carried out by cross-plotting the curves in FIG. 3 and the curves in FIG. 4, which produces the curves of FIG. 5.

Figure 6:
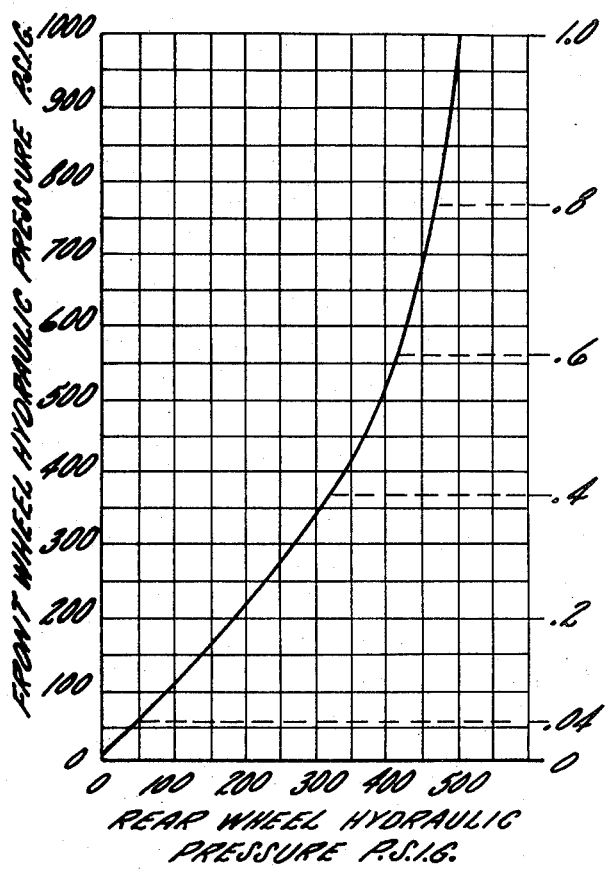
FIG. 6 is a graph of front brake line system pressure plotted against rear brake line system pressure.

Accordingly, the curves of FIG. 5 illustrate the required hydraulic pressures in the front and rear braking systems to produce maximum vehicle deceleration at various tire-road coefficients of friction. In other words, FIG. 5 shows in two curves the relationship between the front hydraulic pressure and the rear hydraulic pressure required to produce the relationship of maximum stopping forces $S_f/S_r$ at any given tire-road coefficient of friction $F_c$. This relationship of front brake line hydraulic pressure to rear brake line hydraulic pressure can be plotted on a single curve using the values on FIG. 5, as shown in FIG. 6, which graph also illustrates the relationship of $F_c$ to rear brake line hydraulic pressure.

According to the Holland method of obtaining maximum vehicle deceleration at any given tire-road coefficient of friction, maximum vehicle deceleration will be obtained by matching the braking force relationship front to rear produced by the brake system to the stopping force requirements front to rear established for that particular vehicle by the Holland equation for $S_f/S_r$. Since the stopping force ratio $S_f/S_r$ varies as a non-linear function of coefficient of friction, the braking force ratio varies as a non-linear function of coefficient of friction (as shown in FIG. 6), total braking force, and vehicle deceleration. Furthermore, since the maximum total braking force that can be applied without wheel lock-up is determined by the maximum tire-road coefficient of friction that can be developed at any given road condition between the tires and the road, the ratio of the front to rear braking force to obtain maximum deceleration without skidding will be a function of the maximum tire-road coefficient of friction.

It will also be observed that for any distribution of disposable load in the vehicle, at each coefficient of friction between the tire and the road, there is a single value of braking force that can be applied to the front and a corresponding value of braking force that can be applied to the rear wheels to achieve maximum deceleration of the vehicle without resulting loss of adhesion between the tires and the road. Under dry, paved road conditions (where the value of $F_c$ approaches unity) the ratio of front-to-rear braking force is at a maximum. Under other conditions, such as on wet pavement or ice (where the value of $F_c$ approaches zero), the lower coefficient of friction results in less weight-transfer effect and, consequently, a different distribution of downward tire forces between front and rear, even though the total downward force of the vehicle remains the same. It can, therefore, be seen that the proportioning of braking force between front and rear which is most effective under one condition will not be correct for another condition where a different coefficient of friction is encountered. It is for this reason that conventional hydraulic braking systems with fixed proportioning of braking forces front to rear inherently cannot achieve maximum deceleration. If a braking system is set up to proportion front-to-rear forces to give maximum braking under maximum tire-road friction conditions, with a relatively larger proportion of braking force applied to the front wheels, the use of the same ratio under low friction conditions such as on ice covered pavement will result in an excessive proportion of braking force at the front wheels and consequent underutilization on the rear wheels or impending skidding of the front wheels before the rear wheels are utilized to maximum braking effect. On the other hand, if the fixed proportion is set up to favor lower friction conditions, then an attempted maximum stop under more favorable friction conditions will result in exceeding the adhesion capability of the rear tires by producing a greater proportion of braking force than they can accommodate without skidding. This results not only in losing the optimum stopping distance for the vehicle, in the absence of anti-skid control, it also increases the dangers of losing control of the vehicle because the skidding rear wheels will tend to induce a spin.

In conventional hydraulic brake systems for automotive vehicles, by the simultaneous application of fluid pressure from a master cylinder to individual slave cylinders in the brake mechanisms of each wheel, the brakes are applied concurrently providing equal or directly proportional braking forces at the front and rear wheels depending upon the relative size of the front and rear slave cylinders. It is also common practice to separate the hydraulic systems between front and rear to assure the operation of one pair of brakes in case the other hydraulic system fails. However, in these split systems, interconnection of the two master cylinders is provided to assure substantially equal front and rear pressures. Occasionally pressure limiting devices and other means have been inserted in the rear brake system to system limit maximum rear brake system pressure, or otherwise modify the front to rear braking force relationship in some arbitrary manner. These pressure limiting devices produce a non-continuous front-to-rear brake force relationship. Since the ratio of front-to-rear braking forces (and consequent hydraulic pressures) required for maximum vehicle deceleration on various types of road friction surfaces does not vary linearly with the tire coefficient of friction, and is a continuously varying ratio, as shown in FIG. 6, none of these systems can provide optimum braking effect except at one or two values of coefficient of friction, and must necessarily produce non-optimum results for all other road conditions.

Turning again to FIG. 6, this graph illustrates values of concurrent front and rear hydraulic system pressure at any value of coefficient of friction $F_c$ for an exemplary vehicle weight, configuration and hydraulic brake system, and which will provide maximum vehicle deceleration. It will be observed that these pressures are not simple straight line relationships, but rather a family of continuous curves of a more complex nature, and are determined for a particular vehicle and not by any arbitrary equalization or non-equalization factor within the braking system for proportioning the braking forces between front and rear.

VARIABLE PROPORTIONING DEVICE

In keeping with this invention, variable proportioning between front and rear braking forces at various total braking forces to produce maximum deceleration of the vehicle, is obtained by the variable proportioning device 48 shown schematically in FIG. 10 and detail in FIG. 11 which is constructed according to the invention described in copending Holland application Ser. No. 54206.

The variable proportioning device 48 is mounted on the vehicle and is contained within a housing 56 having an inlet port 58 for high pressure from the master cylinder and an outlet 60 for the rear brake line 62, the inlet port 58 being connected to the master cylinder port 64 through a conduit 66. Variable proportioning is obtained by a regulating valve means 68 which is contained within the housing and regulates the fluid pressure in the outlet 60 to the rear brake line 62 as a nonlinear function of inlet pressure from the master cylinder. From the high pressure inlet 58, pressure fluid is directed through a passage 70 in the housing 56 into a first cylinder 72 containing a piston 74. Another passage 76 carries a high pressure fluid from the inlet 58 into a check valve chamber 78 containing a check valve ball 80 urged by a spring 82 into sealing contact with an opening forming a seat 84 for the ball 80 and leading to a regulated pressure cylinder 86 containing a second piston 88. From the regulated pressure cylinder 86 a passage 89 which bypasses the high pressure passage 76 connects to the regulated pressure outlet 60. Both pistons 74, 88 are provided with seals 90 made of "Teflon" or other low friction material and in the illustrated device the pistons are constructed as a single coaxial piston shuttle with the pressure faces of th pistons oppositely disposed and of equal size so that the pressure forces on the shuttle from the high pressure cylinder and the regulated pressure cylinder are in direct opposition. A pin 92 is carried by the second piston 88 which contacts the check valve ball 80.

With the structure thus far described, the valve would operate as a fixed ratio proportioning device utilizing high pressure forces on the first piston 74 which tend to urge the piston shuttle to the right and regulated pressure forces in the pressure cylinder 86 acting on the second piston 88 which tend to urge the second piston and thus the piston shuttle to the left. When the inlet pressure forces on the first piston exceed the regulated pressure forces on the second piston, the piston shuttle will be displaced to the right, moving the ball 80 off its seat and allowing high pressure from the passage 76 to the inlet to pass through the passage 89 to the regulated pressure outlet 60. Since as shown the opposing pistons have substantially the same area, in the absence of means to vary the ratio, the valve would provide a fixed proportioning ratio of unity between the inlet and outlet pressures. Such a means for varying the ratio is included, herein shown as a piston, spring, cam lever and connecting means assembly 94 for applying a variable biasing force to the piston shuttle, for varying the proportioning ratio, and the front-to-rear braking effect as a function of inlet pressure and thus total braking force, since the inlet pressure bears a predetermined relation to the total force applied. The piston, spring, cam lever and connecting means assembly 94 applies a predetermined non-linear biasing force which is representative of tire adhesion, weight-transfer, and wheel brake mechanism characteristics of the vehicle. This is accomplished by providing a conduit extension 96 carrying inlet pressure equal to (or having a known relationship to) front wheel brake system pressure, to a third cylinder 98 containing a third piston 99. The third piston 99 has a low friction seal 100 of "Teflon" or like material similar to the seals on the first and second pistons, and is received at its opposite end in a low friction bushing 103 in the housing so it is freely slidable in the housing.

Pivoted to the third piston is a cam lever arm 105. The cam lever arm has at one end a hook 107 to which a biasing spring 109 is attached. At the other end, the cam lever arm has a cam surface 111, which is urged by the biasing spring against a connecting means consisting of a slotted lever arm 113 which is pivoted on a pin attached to the housing and applies a variable biasing force to the piston shuttle.

With a vehicle of known size, weight, load distribution and wheel brake mechanism, a biasing spring 109 is selected and the shape of the cam surface 111 on the cam lever arm is determined as described in said co-pending application Ser. No. 54,206 of Harvison C. Holland so that the contact point of engagement with the slotted lever arm 113 is moved in response to front wheel brake system pressure represented by the motion of the third piston 99 in a manner which varies the biasing force applied to the piston shuttle. In this way, the ratio of front to rear brake line pressures is varied as necessary to match the specifications therefor as shown for example in FIG. 6 and thereby match the stopping force requirements for both front and rear wheels to achieve maximum deceleration.

The biasing spring is anchored to the housing 56 on a support bar 108 and exerts a force tending to move the cam lever arm 105 clockwise as seen in FIG. 11. The cam surface of the cam arm is thus urged to the right and contacts the slotted lever arm 113 at points along its length depending on its position as determined by the motion of the third piston 99 in response to the pressure fluid in the brake line.

In operation, with a relatively low hydraulic pressure representing low manual force on the brake pedal and low total braking forces, the piston, spring, cam lever and connecting means elements 94 will assume the position shown in solid lines in FIG. 10 with the contact point between the slotted lever arm 113 and the cam arm 105 being at point A. It can be seen that in this position the mechanical advantage of the biasing spring 109 in acting to move the piston shuttle to the left is small, because the contact point A is toward the tip of the cam lever arm, and near the pivot of the slotted lever arm. At higher pressure representing high total braking forces, however, the third piston 99 will move to the right, shifting the cam lever arm 105 to some alternate position as indicated in phantom and moving the contact point to B. Here the contact point is in a position which gives the biasing spring 109 a greater mechanical advantage in urging the poiston shuttle to the left, increasing the biasing force by an amount greater than the increase in the force of the spring and thus the proportioning of the hydraulic pressures achieved by the device will be correspondingly different. As the biasing force on the piston shuttle is enhanced through the movement of the third piston 99 to the right under increased inlet pressure, the ratio of inlet to outlet pressures will become greater; that is, the outlet pressure to the vehicle's rear brakes will be diminished in a non-linear manner as a function of total braking forces.

The values for the biasing spring 99 and the specific shape of the cam surface 111 are calculated to produce in the operation of the proportioning device the relationship of front wheel hydraulic pressure to rear wheel hydraulic pressure specified for the particular vehicle on which the system of this invention is to be installed. For example, the device may be devised to produce the relationship of front to rear wheel hydraulic brake pressures as shown in FIG. 6 for an exemplary automobile and conventional hydraulic brake system. FIG. 7 is a design curve for a proportioning device constructed to obtain the front-to-rear wheel hydraulic pressure relationship illustrated in FIG. 6. Thus a cam surface for the cam lever of the proportioning device is calculated to produce pressures in the rear brake lines ($P_{rv}$) at various inlet pressures from the master cylinder ($P_{rm}$). Since the inlet pressure from the master cylinder for the rear brake lines has a known relationship to the pressure from the master cylinder for the front brake lines, the proportioning device provides the requisite front-to-rear brake line pressure relationship for maximum deceleration as shown in FIG. 6.

The fluid pressure controlled by the proportioning device will lie within a hysteresis band caused by the delay in opening and closing the check ball valve due to the friction inherent in all moving mechanisms. Based on pressure, spring and friction force data for the parts of the device, the upper and lower curves are included in FIG. 7 to define the hysteresis band within which the device should operate. The proportioning device also includes a rotatable end cap 114 which is adjustable to adjust the tension on the biasing spring. The rotatable end cap should be in the mid position for the design curve of FIG. 7 which is the middle curve shown in that graph. Rotating the end cap 114 in either one direction or the other raises or lowers the $S_f/S_r$ curve of FIG. 2 (as illustrated by the dashed curves) to take into consideration vehicle loading, or changes in the brake system or in tire characteristics of the vehicle.

Figure 8:
FIG. 8 is a graph of coefficient of friction plotted against slip ratio.

To aid in understanding what is achieved by variable proportioning of brake line pressures in conjunction with control of the total braking force responsive to deceleration, reference is made to FIG. 8 which is a graph of coefficient of friction ($F_c$) plotted against slip-ratio, which is the ratio of the velocity of the tire with respect to the road surface at the point of contact. FIG. 8 is based on test curves published by NASA in report TRR-20 (1959) for aircraft tire-runway performance, and is believed generally representative of automobile tire-road performance. FIG. 8 shows the relationship between coefficient of friction and the amount a tire crawls, slips or slides along the road surface. From FIG. 8 it will be noted that to achieve maximum stopping force at the tire-road surface, a peak value of coefficient of friction must be developed by the application of sufficient braking force to produce the slip-ratio corresponding to that peak value for a given tire and road surface. One objective of variable proportioning as the term is used herein, is to achieve the peak value of coefficient of friction at both front and rear wheels, so as to achieve maximum stopping force at both front and rear wheels. It will also be observed from FIG. 8 that with variable proportioning, applying a total braking force which exceeds that producing the peak value of coefficient of friction will result in an unstable condition since an increase in slip-ratio results in a decrease in coefficient of friction which will, in turn, produce more slip and the start of wheel lock-up.

ANTI SKID COMPONENTS

To prevent wheel lock-up and vehicle skidding, according to this invention the total braking force is reduced at the start of wheel lock-up which occurs simultaneously at both front and rear wheels; the total braking force is momentarily held at a lower value to allow the tires to achieve a slip ratio below the peak of the coefficient of friction curve; and then, the total braking force is again increased to achieve the peak coefficient of friction. This cycle is repeated with the result through variable proportioning of modulating the maximum braking forces at both the front and rear wheels about their maximum to maintain maximum deceleration without skidding.

For sensing that wheel lock-up has started, means are included to respond to changes in deceleration of the vehicle. It is recognized that various types of deceleration responsive control means 45 could be used, but for illustration a pneumatic decelerometer 46 (FIG. 11) or an electrically operated monitor valve 47 (FIG. 16) are disclosed, both means being operable to control via the booster the total braking force developed with the power assist provided by the booster.

POWER BOOSTER

In order to understand how the deceleration responsive means functions in the system, the power booster 42 which it controls will first be described, this booster also being described in Rockwell application Ser. No. 168,683, filed Aug. 3, 1971, entitled Skid Control System Components. The booster 42 is of the vacuum suspended type having a casing 122 and a diaphragm supported power wall 124 movably mounted in the casing and connected to the output rod 126 of the device which operates the master cylinder pistons 128, 130. A three-way control valve 134 is utilized in the power booster for modulating the pressure in the power chamber 136 behind the power wall 124, while the casing chamber 138 ahead of the power wall is connected through a check valve (not shown) to the intake manifold 44 of the automobile engine through a hose 140. The three-way control valve 134 is effective to modulate the pressure in the power chamber 136 behind the power wall upon actuation by an actuating rod 142 connected to the brake pedal linkage. A reaction mechanism 144 is also included which can be of conventional construction, such as that shown in Bauman U.S. Pat. No. 3,033,173, which is referenced for illustration only, or it may be of improved construction as shown in said copending application Ser. No. 168,683.

As previously noted, one of the principal features of this invention is control of the total braking force responsive to changes in deceleration of the vehicle reflecting impending wheel lock-up, through control of the power booster. In the form of system shown schematically in FIG. 10, this is achieved by control of the differential pressure across the movable power wall of the booster to modulate the output force produced by the booster and the braking forces at both front and rear wheels about their maximum to maintain substantially maximum vehicle deceleration for a given tire-road coefficient of friction while preventing wheel lock-up and vehicle skidding.

A conventional vacuum suspended power booster is supplied with two sources of pressure, "vacuum" and "air;" the present vacuum suspended power booster 42 is constructed to utilize a differential pressure which is modulated by deceleration responsive means over a range, rather than the fixed differential pressure between "vacuum" obtained from the engine intake manifold and "air" at atmospheric pressure.

In the present booster, to receive a modulated air pressure from such deceleration responsive means 45 (herein shown as a decelerometer 46 or a monitor valve 47 (FIG. 16)) the power wall assembly 124 of the booster 42, as shown in FIG. 11A, is constructed with a sealed air chamber 146 formed between two spaced plates 148, 150, clamped to the inner rim of the supporting diaphragm 152. The air at modulated pressure is conducted to the air chamber 146 through a flexible hose 154 carried inside the vacuum chamber 138 of the booster. When supplied from the decelerometer 46, for example, the air is received from the output passage 156 of the decelerometer. Thus the air hose 154 is fixed at one end to an inlet fitting 158 which is clamped to a tubular elbow 160 projecting inside the vacuum chamber 138 from the tubular bracket 120 supporting the decelerometer, while the other end of the flexible hose 154 is connected to a fitting 162 on the power wall 124.

Control of the differential pressure across the power wall of the booster in the range of braking forces up to the skid point is achieved by the three-way booster valve 134 which operates over this range in the conventional manner. The pressure in the air chamber 146 on the power wall is maintained at a sufficient differential above the power chamber pressure by the decelerometer 46 or monitor valve 47, so that sufficient flow of air to the power chamber is provided by actuation of the booster control valve 134 to produce power booster output forces sufficient to operate the brakes via the master cylinder actuation. Thus, the valve 134 includes a tubular rubber valve element 164 having a radially extending rubber disc 166 at one end reinforced by a rigid ring 168 and providing concentric air and vacuum valve seats 170, 172. The tubular rubber valve element 164 is supported at its other end, so as to provide for axial movement of the rubber disc, by a flexible skirt 174 which extends radially and is clamped at its outer edge to the power wall 124 in any suitable way. A fixed air valve seat 176 is formed at the inner circular edge of one of the power wall plates 148 and the disc 166 of the valve element is movable onto and off the fixed air valve seat 176 to control flow of air from the air chamber 146 on the power wall 124 to the power chamber 136 behind the power wall.

The vacuum valve of the three-way booster control valve is formed between the vacuum valve seat 172 on the movable disc 166 of the valve element and a cooperating seat 178 formed by the circular forward edge of a valve member 180 operably moved by the brake pedal. This valve member 180 is carried for sliding movement within a tubular rearward extension 182 of the power wall 124, which extenion is integral with the rear plate 148 forming the power wall. The power wall extension 182 slides within a rubber seal 184 on the axis of the booster casing and surrounding the opening in the casing rear wall 186 through which the extension projects. The valve member 180 is operated by the actuating rod 142 connected to the brake pedal linkage, and the valve member 180 extends forward through the open center of the rubber valve element 164 leaving an annular passage around the outside of the valve member which communicates with the vacuum chamber 138 on the forward side of the power wall 124. A brake linkage return spring 188 is included, and a light spring 190 to positively return the rubber valve element and thereby close the air valve is also included.

The three-way booster control valve 134 is shown in FIG. 11A with the rubber valve element 164 and other components in the fully returned position with the air valve closed and the vacuum valve open; it will be clear that upon application of the brake pedal, the actuating rod 142 will move the valve member 180 forward to engage the vacuum valve seat 172 on the movable rubber valve element thereby closing the vacuum valve — in this position of the assembly both the air and the vacuum valves are closed — this is commonly referred to as the lapped position of the three-way valve. Further actuation of the brake pedal moves the actuating rod 142 and valve member 180 forward carrying the rubber valve element 164 forward and lifting it off the fixed air valve seat 176, thereby opening the air valve and allowing air in the sealed chamber 146 on the power booster wall 124 to flow into the power chamber 136 behind the power wall. The increase in pressure in the power chamber behind the power wall produces a differential pressure across the power wall which causes the power wall to move forward in the casing, the three-way valve 134 having a self-lapping action which results in the air valve being closed upon forward movement of the power wall and the vacuum valve being maintained closed when the portion of the reaction to the output force developed by the unit transmitted back toward the brake pedal through the reaction mechanism 144 balances the force applied to the brake pedal by the operator.

DECELERATION RESPONSIVE CONTROL

Means for controlling the differential pressure supplied to the power booster such that the differential pressure is responsive to deceleration to control the operation of the booster and, more particularly, to prevent wheel lock-up and vehicle skidding will now be described. One embodiment of the invention provides for a pneumatic deceleration responsive means (the decelerometer 45) while another embodiment employs an electronic system to detect deceleration and control the monitor valve 47 which controls the power booster.

I. Turning now to the pneumatic deceleration responsive means for controlling the power booster, and while the copending Rockwell application Ser. No. 168,683, may also be referred to, the decelerometer 45 shown in FIGS. 10 and 11b, in general comprises a valve body 210 or housing having a central chamber-defining portion 211. Within the central portion 211 of the valve body there is provided a three-way valve indicated geenerally at 212, and a dumbbell-shaped inertia mass 213 for actuating the valve 212 to modulate the output pressure from the decelerometer, which is the supply pressure to the booster, as a linear function of deceleration, as illustrated graphically in FIG. 9, which supply pressure is conveyed through the passage 156 to the booster 42. Since the booster is also supplied directly with "vacuum," control of the air supply pressure by the decelerometer 45 achieves the desired end of controlling the differential pressure supplied to operate the booster.

Within the central portion 211 of the decelerometer housing 210 are openings for connection to two sources of pressure including, in the present case a port 215 connecting to atmosphere and a port connecting to a source of vacuum. The port 215 is protected by a mesh filter 218 and a perforated screen 219 which serves to filter the atmospheric air as it passes through the port 215.

The inertia-mass 213 is supported for axial sliding movement at a forward end (to the left as seen in the drawing) by a bushing 223 and at a rear end by a bushing 225 contained within a bore in the inertia-mass itself, and supported on a protruding stub shaft 226 carried by a diaphragm housing 227 fastened to one end of the valve body 210. The inertia-mass 213 is thus freely slidable in the bushings 223, 225 in an axial direction within the housing 210 in response to deceleration forces.

Within the central chamber forming portion 211 of the housing are chambers including a first pressure chamber 228 open to atmospheric pressure through the port 215, a second pressure chamber 229 separated from the first pressure chamber 228 by a wall 230 and connected to the vacuum source through the port 216, and a third output chamber 231 separated from the first pressure chamber 228 by a body wall 232. The second pressure chamber 229 is connected to a vacuum source which in the present case is served by the vacuum chamber 138 of the power booster 42, through a vacuum passage 233 in the mounting bracket 120, which vacuum chamber 138 is maintained at a sub-atmospheric pressure of about 5 p.s.i.a. by connection to the engine intake manifold 44 through a check valve and vacuum hose 140 (FIG. 10) as compared to the about 14.7 p.s.i.a. available from the atmosphere at the port 215.

The differential between the pressure in the output chamber 231 of the decelerometer and the vacuum source is modulated by controlled opening of an air valve 236 and a vacuum valve 237 which are components of the three-way valve 212. One movable element of the three-way valve 212 is a valve spool 238 coaxially and slidably received on the inertia-mass 213. The valve spool 238 has internal passages 239 connecting the output chamber 213 to the air and vacuum valves 236, 237 which control or modulate the output pressure.

Both the air and vacuum valves 236, 237 comprise annular rings 236', 237' of resilient material inlaid into circular slots in the corresponding faces of the valve spool 238. The inlaid material forms a sealing ring which abuts against a corresponding annular boss 236, 237 which forms a seat. In the case of the vacuum valve 237, the seat 237'' thus formed is on the forward-facing surface of the inertia-mass 221, while the ring 236' of the air valve 236 seats against an annular boss 236'' formed in the chamber wall 232 separating the first pressure chamber 228 and the output pressure chamber 231.

While the valve spool 238 is slidably received on the inertia-mass 213, it is also connected to the body wall 230 by a flexible annular diaphragm 240. The diaphragm 240 is shown flexed in a rearward direction in response to the atmospheric pressure forces within the first (high) pressure chamber 228. Pressures within chambers of the unit act on a resultant area and produce pressure forces tending to move the inertia-mass 213 and valve spool, while resilient forces produced by the springs 241, 242, and deceleration forces acting on the inertia-mass 213 also tend to move the inertia-mass and valve spool to control the pressure in the output chamber 231 of the unit.

In the static condition of the unit, the result desired is pressure in the chamber 231 connected to supply air to the booster which is maintained at a small differential (in this illustrative embodiment of the invention about 2 p.s.i.) above the pressure in the vacuum pressure chamber 229. This result is achieved, in the present case, by having a chamber 243 at the rear (right-hand) end of the inertia-mass 213 connected to output pressure through the passage 244 and sealed by the diaphragm 245; by having the diameters of the valve rings 236', 237' substantially equal to the mean diameter of the diaphragm 240; and by having the mean diameter of the counter balancing diaphragm 246 at the rear end of the inertia-mass 213 smaller than the diameters of the valve rings 236', 237'. This arrangement provides a resultant area in the form of an annulus A (FIG. 11b) acted against by the pressure differential between the output pressure in the chamber 231 and the low pressure in the chamber 229, tending to move the inertia-mass 213 to the right in the unit and thereby close the air valve 236. The vacuum valve 237 is urged to its closed position by the light coil spring 241 which is located between the inertia-mass 213 and the valve spool 238, so as to urge these elements in opposite directions and thereby hold the valves 236, 237 closed and in sealed, lapped position.

In the condition of zero deceleration, the static condition of the unit, air in the air chamber 228 admitted past the air valve seat defined by the resilient ring 236' of the air valve 236, tends to raise the pressure in the output chamber 231 relative to the pressure in the chamber 229. The magnitude of the differential pressure thus created is a function of the initial force of the springs 241 and 242 and the size of the resultant area A. It will be seen that the output pressure supplied to the booster will increase until the differential pressure acting on the resultant area A produces a force which is substantially equal to the opposing force exerted by the two springs 241, 242. This sets the approximate magnitude of the differential pressure.

It will further be seen that the magnitude of this differential pressure (at the static condition) will be maintained in a range the upper limit of which is set by the initial force of the two springs 241, 242 and the lower limit of which is set by the initial force of the lead spring 242 alone. In an illustrative embodiment of the invention this range was held at a minimum value by utilizing a substantially heavier lead spring 242 than biasing spring 241.

In the dynamic condition, deceleration of the inertia-mass 213 produces a force proportional to the rate of deceleration which tends to move the inertia-mass 213 forward (to the left in FIG. 1). This deceleration produced force is opposed by a pressure produced force, due to the differential in pressure between the low pressure input and the output acting on the resultant effective area of the annulus A. The force produced by deceleration of the inertia-mass 213 acts to move the inertia-mass 213 forward in the valve housing 210 to open the air valve 236. It is an important feature of the decelerometer that the total movement of the inertia-mass to open the air valve 236 is extremely minute, on the order of 30 to 40 thousandths of an inch in either direction from lap position in a physical embodiment of the invention. The air and vacuum valves at their seats have a relatively large diameter, and the valves have large internal passages, however, so as to allow air flow (illustratively in a small fraction of a second) through the supply passage 156 sufficient even at such small valve openings to operate the power booster 44. Assuming a constant rate of deceleration, air admitted past the valve 236 will increase the supply pressure until the pressure differential between the chamber 231 and the vacuum chamber 229 acting against the area of the annulus A balances the forces due to that rate of deceleration acting on the inertia-mass 213 and moves the inertia-mass rearward to close the air valve 236 while the vacuum valve 237 remains closed, as shown in FIGS. 13 and 14. The valve will remain in this steady-state lapped condition so long as uniform deceleration is maintained, resulting in a constant supply pressure differential which is a measure of deceleration as shown in the graph, FIG. 9. When deceleration lowers or ceases, the inertia force is unbalanced by the pressure force, causing the vacuum valve 237 to be opened until the predetermined initial differential pressure is again achieved.

II. The embodiment described in the preceding section utilizes one method of controlling the supply of pressure fluid for operation of a power booster in a vehicle braking system in response to the deceleration and skid conditions of the vehicle. However, the invention is not limited in scope to an inertia responsive pneumatic valve, but rather it includes other means for detecting these skid conditions and controlling the differential pressure supplied to the power booster. One other embodiment is the electronic system of control diagrammatically illustrated in FIG. 17. With the electronic system it is unnecessary to use the inertia responsive pneumatic decelerometer shown in the previous embodiment. Instead, a somewhat simplified monitor valve such as that shown in FIG. 16 may be used to control the supply of pressure fluid to the power booster in response to electrical signals.

Referring to FIG. 17, a voltage generating device 280–283 associated with each wheel of the vehicle generates an electrical voltage the magnitude of which is proportional to the speed of rotation of the associated wheel. The generating devices 280–283 may take any of numerous forms known in the art. For instance, the generating device may be a permanent-magnet generator having 60 to 100 field poles providing an output voltage through a rectifier which is proportional to the speed of rotation or velocity of the associated wheel. In addition, each wheel has an associated electrical channel for developing voltage signals corresponding to the deceleration and rate of change of deceleration of that respective wheel. The method shown for developing these signals involves feeding the velocity signals from the generating devices 280–283 through conventional differentiator circuits 286–289, the outputs of which are in the form of voltage signals proportional to the deceleration of the respective wheels. Each of the deceleration signals is then fed into one of a second group of conventional differentiator circuits 291–294 to provide an output voltage proportional to the rate of change of deceleration of the associated wheel. For detecting the impending skid condition of the vehicle there is provided a threshold detecting circuit 297 having an input terminal 298 to which the outputs of the differentiators 291–294 are connected. The threshold detecting circuit 297 provides an output signal to energize a relay 299 when the rate of change of deceleration of the wheels exceeds a predetermined threshold value which indicates the impending lock-up condition of the wheels. A power supply 300 including an oscillator to provide a time base for differentiation is energized by the vehicle battery 301 which is connected to each differentiation circuit and to the threshold detecting circuit 297. The threshold detecting circuit 297 is constructed so that its output voltage goes "On" at the occurrence of a first input pulse above a predetermined threshold and "Off" upon the occurrence of the next input pulse exceeding the predetermined threshold. Such a threshold detecting circuit may take any of various forms well known to the pulse-switching art. In order to make the control fail-safe, a time sensitive logic circuit may be provided to insure that the threshold circuit output returns to the "Off" condition after receiving the "On" pulse, even if the "Off" pulse does not occur with sufficient strength. The relay 299 controls the current from the battery 301 to the solenoid of the three-way valve described below.

In operation, the method for detecting the impending skid condition of the wheels is based on a technique utilizing the rate of change of deceleration of the wheels themselves. The signal diagrams included in FIG. 17 illustrates the electrical signals appearing at various portions of the circuit during deceleration of the vehicle. It is seen that the impending lock-up of a wheel produces a rate-of-change of acceleration signal in the form of a high voltage spike $d_1$. A second high voltage spike $d_2$ is generated by the wheels approaching vehicle velocity after a period of deactivation of the brake booster by the monitor valve when the relay 299 closes. The threshold detecting circuit 297 is turned "On" and "Off" respectively when the magnitude of the signals $d_1$ and $d_2$ exceed a voltage threshold T established at the input of this threshold circuit.

The monitor valve (FIG. 16) used in the electrical embodiment is balanced to allow rapid response to an electrical signal applied to a small solenoid 310 and is similar in some respects to the decelerometer valve previously described. Therefore, the elements which are common to the two valves are given identical numbers with subscripts added to the numbers used for the latter embodiment. As in the previously described valve, the valve shown in FIG. 16 includes a high pressure port $215_1$, a low pressure port $216_1$ and an output chamber $231_1$ which is connected to supply air to the power booster. The fluid pressure in the output chamber $231_1$ is controlled by an air valve $236_1$ and a vacuum valve $237_1$. In place of the inertia-mass of the previously described decelerometer, the present monitor valve includes an elongated member $213_1$ having an outwardly flanged end 311 and an opposite end 312 acting as a movable core member for the solenoid 310. A valve spool $238_1$ is slidable on the member $213_1$ and operates similar to the valve spool 238 of the previous embodiment. The method of maintaining the pressure of air supplied from the monitor valve to the booster at a precetermined value above the pressure behind the booster power wall differs from the previous embodiment. In this case, the power chamber pressure behind the power wall is supplied to the monitor valve through port 313 at the right side of the monitor valve. Booster chamber pressure is, therefore, one of the controlling pressures on the valve member $213_1$. With this arrangement, as the power chamber pressure of the booster increases in response to pedal force through actuation of the booster control valve, the air valve $236_1$ opens to raise the pressure in the chamber $231_1$ proportionately. The pressure in the chamber 231 is maintained at a constant lead differential above the power chamber pressure at the port 313 by a lead coil spring $242_1$ similar to the coil spring 242 of the previous embodiment.

In operation of the power booster and monitor valve over the range of operation up to the start of wheel lock-up, the pressure in the chamber $231_1$ is maintained at a predetermined differential (about 2 p.s.i.) above the power chamber pressure, the monitor valve being operated in response to changes in power chamber pressure such that a higher pressure is available to create a pressure differential across the power wall upon actuation of the booster control valve by the brake pedal, as in the previously described embodiment.

OPERATION FOR MAXIMUM DECELERATION WITHOUT SKIDDING

How the variable proportioning device, the deceleration responsive control means and the power booster function together so as to maintain maximum vehicle deceleration without skidding will be better understood from an analysis of operation of the system and a consideration of the X and Y curves on FIG. 9 and the X' and Y' curves on FIG. 9A. Referring first to FIG. 9, it includes a booster performance curve X which depicts a substantially linear relationship between deceleration and the differential pressure between the pressure in the power chamber behind the power wall and the vacuum chamber pressure in front of the power wall. The dual lines forming the curve X illustrate a hysteresis band for the booster, and the separate lines for the curve Y illustrate the desirably narrower hysteresis band for the decelerometer 46.

In the development of this curve X, several assumptions are made as to the operating characteristics of the vehicle braking system and the power booster during braking of the vehicle up to a skid point. The first assumption is that the stopping force supplied at the road surface to the tires (and hence deceleration of the vehicle) is proportional to the output force from the booster, which is the sum of the manual force supplied to the brake pedal and the power assist supplied by the booster.

The second assumption is that the output force from the booster over the operable range where wheel skidding may be experienced, is proportional to the pressure differential across the power wall which operates the power wall and develops the output force. The booster components should be constructed to produce this linear output performance characteristic.

With these assumptions, it will be seen the booster performance curve X matches the performance curve Y of a deceleration responsive control means such as the decelerometer 46 which produces differential pressure (between the chamber 146 in the power wall and the vacuum chamber ahead of the wall) that has a linear relationship to deceleration.

Curve Y, furthermore, is shown above curve X, illustrating that the modulated air pressure in the chamber 146 in the power wall is higher than the pressure in the power chamber throughout the range of operation where wheel skidding may be experienced. Establishing, maintaining and minimizing this lead in the modulated air pressure supplied by the deceleration responsive means over this range has been found an important requisite for satisfactory operation of the system.

Thus, the curves X and Y should be separated substantially uniformly over the skid range and should not intersect, taking into consideration the hysteresis band of both curves. The separation between the curves should, furthermore, be sufficient to permit normal operation of the booster upon actuation of the brake pedal and resultant actuation of the booster control valve in the range of operation of the booster up to the point of maximum required braking forces. As an illustration, the curves X, Y of FIG. 9 are shown uniformly separated by approximately 1.5 p.s.i. which has been found sufficient to permit normal operation of a small car booster, for example, for a Ford Mustang.

Moreover, the uniform separation of the X, Y curves should be maintained at a minimum, sufficient to permit such normal operation of the booster, but at a minimum value so that the reduction in supply pressure to the booster when the deceleration responsive means detects impending wheel lock-up will be effective to substantially instantaneously reduce the differential pressure across the power wall of the booster to reduce the output force from the booster to prevent wheel lock-up.

Now turning to FIG. 9a, it includes a performance curve X' which depicts a non-linear relationship between deceleration and the differential pressure between the pressure in the power chamber behind the power wall and the vacuum chamber pressure in front of the power wall. The dual lines in the curve X' again illustrate the hysteresis band for the booster. Graph Y' again is shown above or leading Graph X' by a sufficient supply pressure to operate the booster, and should be uniformly separated as shown throughout the range of operation where wheel skidding may be experienced.

The non-linear curves on FIG. 9a are included to illustrate the fact that power boosters may not have a linear output. In such event, and if the decelerometer 46 is used as the deceleration responsive control means, it would be necessary to alter the structure of the decelerometer to produce a non-linear supply pressure, since it is shown as having linear characteristics.

However, in the event a non-linear booster is used in conjunction with the electronically controlled monitor valve, the "lead" pressure in the air chamber relative to the power chamber is provided by the lead spring $242_1$ regardless of any non-linear output characteristics of the booster. The result is that the curves X', Y' in FIG. 9a are representative of the performance of the electronically controlled monitor valve in the system having a booster with a non-linear output.

In the static condition of the system, the initial control means supply pressure (approximately 7 p.s.i.a.) is maintained in the sealed air chamber 146 of the booster 42 by either the decelerometer 46 or the monitor valve 47. When the brake pedal 40 is applied to actuate the power booster, air at the control means supply pressure is, therefore, available in the sealed chamber 146 of the power booster, and when the booster control vacuum valve is closed and the air valve is opened responsive to movement of the brake pedal, air will be admitted from the sealed chamber 146 to the power chamber 136 behind the power wall 124, causing the power wall to move and operate the master cylinder pistons 128, 130. These pistons upon forward movement develop pressure in the brake lines which will apply the front and rear brakes causing the vehicle to begin to decelerate.

Deceleration of the vehicle will be reflected in a higher supply pressure from the control means 46, as shown in FIG. 9; the control means, in effect, increases the pressure in the air chamber 146 in the booster power wall and air at a higher pressure is, therefore, available to further increase the output force developed by the booster 42 when further manual force is applied to the brake pedal by the operator. The control means 46 is preferably constructed with a sensitivity to respond to the initial deceleration by increasing the supply pressure as a linear function thereof as shown in FIG. 9, and with a precision to maintain a supply pressure which leads the performance curve X of air pressure in the power chamber 136 throughout the range of operation of the control means up the performance curve to the skid point. By maintaining a predetermined differential pressure between the pressure in the air chamber within the power wall and the power chamber behind the power wall throughout the range of operation up to the skid point, manual operation of the three-way valve in the booster by the operator in the direction of increased force on the brake pedal will always result in increased output force being applied to the master cylinder and therefore to the braking system.

Since the ratio of the braking forces applied to the front and rear wheels will be continuously changed by the variable proportioning device as deceleration increases, the maxiumum stopping forces will be achieved at both the front and rear wheels, producing maximum deceleration before the wheels tend to lock-up simultaneously at a point when the braking force applied to the wheels as a result of increased pressures from the booster operated master cylinders causes the slip ratio (See FIG. 8) to exceed the peak value of coefficient of friction achievable under given tire-road conditions. The wheels start to lock-up simultaneously which will be reflected in a change in the sense of a sudden reduction in vehicle deceleration.

The sudden change in vehicle deceleration resulting from the skidding of the wheels is detected by the deceleration responsive control means in either of its hereinbefore described embodiments and thereafter operates to eliminate the differential pressure between the air chamber and the power chamber and reduces the braking force being applied by the braking system, even though the operator continues to apply the braking pedal. The mechanical advantage of the power booster relative to the braking pedal and mechanical linkage is such that loss of this differential pressure will momentarily release or reduce the output force of the booster notwithstanding the operator applying force to the pedal.

The detailed description of the way in which each of the embodiments of the deceleration responsive control means operates to eliminate this differential pressure, while being generally similar, necessarily are different in detail as one embodiment employs the movement of the inertia mass and the other is electronically controlled. In general, however, both embodiments permit gradual changes in the rate of change of deceleration, i.e. they maintain the differential pressure between the air chamber and the power chamber during these gradual changes, but are operable to eliminate the differential pressure responsive to sudden changes in the rate of deceleration, the magnitude of such sudden changes in deceleration being predetermined to correspond to the impending lock-up of the wheels of the vehicle reflecting an impending skid condition.

The operation of each of the embodiments within the system will now be described in detail.

I. In accordance with an aspect of the present invention, the decelerometer 46 has an enhanced response to such sudden decreases in deceleration, so that the decelerometer will substantially decrease the pressure in the supply chamber 231 in a very short time interval, ideally less than one tenth second. This reduced supply pressure is conveyed to the booster power chamber 136 and causes the power booster power wall 124 to return and reduce the total braking force.

The fast response to decreases in deceleration is accomplished by providing in the decelerometer (FIG. 11b) an independently movable diaphragm assembly 246 mounted adjacent the forward end of the inertia-mass responsive to sudden decreases in deceleration, thereby actuating the valve 134 to decrease the supply pressure. The diaphragm assembly 246 separates the supply chamber 231 from a control chamber 248 which is supplied with power chamber pressure of the booster through a conduit 250 (FIG. 10) and a one-way ball check valve 252 (FIG. 11b). A restricted orifice 254 bypasses the check valve 252 and allows flow in the reverse direction. Since the control chamber is normally maintained at a lower pressure than the supply pressure of the decelerometer via the conduit 250, forward movement of the inertia-mass 213 responsive to gradual changes in deceleration is substantially unimpeded. In the event of sudden predetermined decreases in deceleration reflecting impending wheel lock-up, however, the one-way check valve 252 traps the prevailing higher power chamber pressure in the control chamber 248 while the pressure in the supply chamber 231 is decreased by the movement of the inertia-mass to the right to open the vacuum valve 237.

A regenerative effect is obtained since the diaphragm assembly 246 is moved by the differential pressure between the trapped pressure in the control chamber 248 and the decreasing supply pressure in the supply chamber 231, to thrust the inertia-mass 213 rearward in the direction tending to further open the vacuum valve 237. Thus, sudden predetermined decreases in deceleration result in rearward movement of the inertia-mass assisted by a reverse force produced by the diaphragm assembly 246.

The duration of the regenerative effect is controlled by the restricted orifice 254 which performs a timing function; after a predetermined, relatively short (ideally less than one quarter second) interval, the trapped pressure in the control chamber 248 leaks past the ball valve 252 through the restricted orifice thus eliminating the differential pressure of the control chamber and bringing the pressure therein into equilibrium with the booster power chamber pressure.

It will noted that two diaphragms 247, 247' make up the diaphragm assembly 246 with a common chamber 256 between them connected to the exhaust chamber 233 through a passage 257; this arrangement provides advantages such as low friction and long diaphragm wear. It will be observed, however, that the operative pressures across the diaphragm assembly are the pressures in the supply chamber 231 and in the control chamber 248.

An important feature of this regenerative arrangement is the provision of the one-way check valve 252 which is normally operable to provide free passage and admit the prevailing pressure in the power chamber of the booster to the control chamber 248, and which is effective when deceleration suddenly reduces or decreases tending to return the inertia-mass 213 and valve means to the right to trap the prevailing pressure within the control chamber 248 and thereby accelerate the motion of the mass and valve means toward the right to open the vacuum valve. The check valve or one-way relief valve 252 is large in diameter and is retained by a spring 258 and a threaded receptacle 260 against a seat 262.

A drilled passage 264 connects the flow from the one-way check valve to the control chamber 248. By this means the decelerometer is enabled to respond rapidly to sudden predetermined reductions in deceleration while maintaining close control for gradually changing deceleration conditions.

When a condition of sudden decreasing deceleration occurs, the performance of the decelerometer changes considerably due to the aforementioned regenerative effect. Referring to FIG. 18, curve D represents a typical plot of deceleration over a period of time, while curve P represents the differential pressure across the power wall of the booster for the corresponding deceleration condition. As the curves show, deceleration leads the differential pressure by a very small amount during normal brake application. However, when deceleration suddenly decreases, reflecting an impending skid, the regenerative device goes into action and causes the decelerometer to decrease the differential pressure ideally at a much faster rate. The regenerative effect begins as the inertia-mass 213 moves rearward, closing the air valve 236 and opening the vacuum valve 237. Without the regenerative effect the movement of the inertia-mass 213 rearward would be minute due to the build up of a negative pressure differential on the annulus A tending to force the mass forward. However, the one-way valve 252 traps the previously high supply pressure in the chamber 248 at the forward end of the valve, and the pressure differential created across the diaphragm assembly 246 results in a reverse force produced by the assembly 246 acting against the inertia-mass. This rearward movement of the inertia-mass holds the vacuum valve 237 completely open to allow the supply pressure in the chamber 231 to decrease rapidly, further increasing the differential pressure across the assembly 246 and the regenerative force created thereby until the input and supply chambers are at substantially equal pressures. The restricted orifice 254 allows the pressures in the chambers 248 and 231 to equalize, removing the regenerative force and returning the entire valve to its original condition in readiness for response to further deceleration.

The duration of the regenerative effect after the start of wheel lock-up is controlled by the timing orifice 254 of the decelerometer to reduce the total braking force for a period sufficient to restore the tires in rolling contact with the road surface and to a slip ratio relative thereto (see FIG. 8) to the left of and below the peak of the coefficient of friction curve, as diagrammatically illustrated by the curved arrow Z. The sudden decrease in supply pressure from the decelerometer is conveyed to the sealed chamber 146 on the power wall 124 of the booster through the air hose 154. This chamber in turn communicates through the passage of the booster control valve 134 between the air valve seats 170, 176 to the power chamber 136 of the booster. The objective is to reduce the pressure in the power chamber 136 as rapidly as possible so that the power chamber pressure curve follows the supply pressure curve from the decelerometer. To supplement the flow through the air valve passage in the event the booster control valve is in lapped position or otherwise restricted, a bypass one-way valve 270 is also provided on the power wall 124 connecting the power chamber 136 to the sealed chamber 146 on the wall. Upon reduction in the pressure in the sealed chamber 146 due to a sudden reduction in the supply pressure from the decelerometer 46, the air in the power chamber 136 is returned through the air valve passage supplemented by flow through the one-way check valve 270 and exhausted through the hose 154 to the decelerometer, in effect flowing in reverse direction through the supply passage of the decelerometer. A reduction in the power chamber pressure causes the power booster wall 124 to return (move to the right in FIG. 11) under the force of the hydraulic pressure in the brake lines and master cylinder means, and the return spring 188, which overcomes the reduced pressure differential across the power wall.

A further aspect of the present invention involves a mechanism for effectively shutting off the inertia responsive function of the decelerometer when the vehicle is moving backwards and the forces due to acceleration or deceleration act in a reverse manner on the valve components. Because the decelerometer is operable via the booster to decrease the force applied to the braking system responsive to decreases in deceleration reflecting an impending skid condition, it is apparent that an increase in vehicle deceleration while traveling in the reverse direction or the weight of the inertia-mass while the vehicle is motionless on an upward incline will produce forces acting to move the inertia-mass in the same direction (to the right in FIG. 11b) as a decrease in deceleration of the vehicle deceleration while traveling in the forward direction. Thus, in the absence of a mechanism that immobilizes the inertia responsive function of the decelerometer when the vehicle is in one of these conditions, it is noted that the operation of the decelerometer and power booster may override manual force being applied.

Referring to FIGS. 11a, 11b, and 15, an "On-Off" control diaphragm 320 (FIG. 11b) in the decelerometer 46 is provided to immobilize the inertia-mass 213 by moving it to the left as shown, to keep the air valve 236 open and provide a supply of air at full atmospheric pressure in the air chamber 146 for operation of the booster. The "On-Off" diaphragm 320 is attached to a movable shaft 321 which has a head 322 that is adapted to contact the inertia-mass 213 upon movement to the left of the diaphragm and shaft assembly from the position shown in FIG. 11b. A spring 323 normally urges the head 322 to move to the left opening the air valve 236 in the absence of forces applied to the diaphragm 320.

To control the diaphragm 320, two 3-way valves 326, 327 (FIGS. 11a, 15) are connected to "On-Off" control chambers 328, 329 which are separated by the diaphragm 320. The valve 327 is located adjacent the brake pedal linkage as shown in FIG. 11a, and is operated when the brake pedal is applied, and valve 326 is located adjacent the rear propeller shaft transmission housing at the speedometer drive gear as shown in FIGS. 15, and is operated when the vehicle is moving in the reverse direction. The valves 326, 327 are connected to the "On-Off" control chambers 328, 329 through suitable conduits to apply pressures to the diaphragm 320 as will hereinafter be described.

The valves 326, 327 are similar in construction, with valve 326 having a housing 330 provided with an air chamber 331, a passage 332 communicating to outside air pressure, and a vacuum chamber 333 communicating through a passage 334, conduit 334' (not shown) and passage 334'' (in the decelerometer, FIG. 11b) to a source of vacuum herein shown as the vacuum chamber 138 of the power booster. Both valves have a valve element in the form of a tubular rubber grommet 335 having a movable valve flange 336 and a supporting flange 337 clamped at its outer periphery in the valve housing.

The valve 326 located at the propeller shaft is shown in its normal position when the vehicle is stopped or moving forward and in this state, the air and vacuum chamber 332, 331 are separated by the supporting flange 335 of the grommet element, and the valve flange 336 is seated on an annular seat 338 formed by the housing. In this "normal" state of the valve, air is conveyed from the passage 332 through the tubular center of the grommet element 335 past the end of an actuating rod 340 which has an annular end 341 adapted to contact the valve flange 337 to move it off its seat. Air is conveyed from the air chamber 331 through passage 342 to the "On-Off" chamber 328 (FIG. 11b) of the decelerometer by means of a conduit 342' and an internal decelerometer passage 342''.

An actuating mechanism 345 is provided to move the rod 340 when the vehicle is moving in the reverse direction, so as to convey "vaccum" pressure to the "On-Off" chamber 328 of the decelerometer instead of air pressure, herein shown as a pinion gear 346 which is conventionally provided on the end of the speedometer cable 347. This gear 346 is usually plastic and is slidably mounted on the end of the cable so that it can move axially but is fixed against relative rotation with respect to the cable. The pionion gear 346 is in mesh with a worm gear 348 on the propeller shaft. In the present case the axial movement of the pinion gear 346 to the right in FIG. 15 that occurs when it is driven by the reverse movement of the worm gear 348 when the vehicle is traveling backward is utilized to move the actuating rod 340 so that it lifts the valve flange of the grommet element off its fixed seat, closing communication between the air chamber 331 and the passage 342 and opening communication between the passage 342 and the vacuum chamber 332. Counterclockwise rotation of the worm gear 348 upon forward movement of the vehicle moves the gear 346 to the left which allows the actuating rod 340 to move to the left and returns the valve to the position shown in FIG. 15.

The three-way valve 327 (FIG. 11a) located at the brake pedal linkage is similar in construction to the valve 326, having an air chamber 350 communicating to atmosphere through passage 351 and the vacuum chamber 352 communicating through passage 353, conduit 353' (not shown) and passage 334" to the booster vacuum chamber 138 here utilized as a vacuum source. An actuating rod 356 has an annular end 357 adapted to contact a valve flange 358 of a grommet element 359. Thus, it is seen that the air chamber 350 is normally isolated from the vacuum chamber 352 and communicates with a passage 360 which is connected to the "On-Off" control chamber 329 by way of a conduit 360' and a passage 360".

The three-way valve 327 is secured to the brake pedal arm 361 and therefore moves with the arm when the brakes are applied. A yoke 362 having an annular opening 363 is attached to the booster operating rod 142 and is coupled to the pedal arm 361 by a cross pin 364 secured to the arm. A spring (not shown) maintains the pedal arm in the position as shown in FIG. 11a when the pedal arm is not depressed. It is noted that the cross-sectional area of the cross pin 364 is smaller than the yoke opening 363 to permit travel of the arm 361 prior to contacting the yoke 362 in the forward direction.

To operate the valve 327 communicating the air chamber 350 with the passage 360 while isolating the vacuum chamber 352, a bore 367 on the end of the yoke 362 and a pin 368 are provided, with the pin being slightly spaced from the bottom of the bore 367 as shown. Thus, depressing the pedal arm 361 will also move the valve 327, causing the bore to contact the pin 368 and move it and the actuating rod 356 to the right relative to the valve housing to operate the valve before the cross pin 364 engages the yoke 362 in the forward direction. The valve 327 is located where the stop light switch is conventionally mounted; therefore, the actuating rod 356 may also have a central extension 370 that is connected to operate such a conventional stop light switch 371 now shown carried on the valve housing.

To summarize the various modes of operation of the "On-Off" control diaphragm 320, when the vehicle is traveling backwards the left side of the diaphragm is at vacuum pressure and the right side is at air pressure. When the brakes of the vehicle are applied while traveling in the backward direction the valve 327 located at the brake linkage will communicate vacuum through the passage to the right side "On-Off" chamber 329 of the decelerometer and the diaphragm will be in a "vacuum suspended" mode. The spring 323 will have no diaphragm forces acting upon it and will be free to move the inertia-mass 213 to the left thus opening the air valve 236 to supply full atmospheric pressure to the booster.

Conversely, when the vehicle is stationary on an upward incline with the brakes applied, the left side of the "On-Off" control diaphragm 320 will be at air pressure, and the right side will be at vacuum. If the vehicle starts to roll backwards, the valve 326 at the speedometer take-off will be actuated to connect vacuum pressure to the left side "On-Off" chamber 328 via the passage 342" enabling the spring 323 to again move the inertia-mass to the left in FIG. 11b and open the air valve and connect full atmospheric air supply pressure to the booster.

It will, of course, be observed that the "On-Off" control does not interfere with the operation of the decelerometer when the vehicle is traveling forward. Thus, when the vehicle is traveling forward without the brakes being applied, both "On-Off" control chambers 328 and 329 are at air pressure and the diaphragm 320 will be in an "air-suspended" mode. Application of the brakes actuates valve 327 to connect vacuum pressure to the right "On-Off" chamber 329 while the left chamber 328 is sustained at air pressure. The force on the diaphragm thus overcomes the force of the spring 323 moves the shaft 321 to the right and clear of the inertia mass so that it is freed for movement responsive to deceleration forces.

I. The operation of the electronically controlled embodiment is such that gradual changes in the rate of deceleration maintain the differential pressure between the air chamber in the power wall and the power chamber behind the power wall by the force in the spring $242_1$. Since the valve member $213_1$ is balanced by the supply pressure acting against the force of the spring plus the power chamber pressure acting on the diaphragm 314, this differential pressure will be maintained unless the solenoid 310 is energized.

The electronic system illustrated in FIG. 17 controls the solenoid and does not energize the solenoid for gradual changes in the rate of deceleration. The electronic system is, however, responsive to predetermined changes in deceleration reflecting impending wheel lock-up, for as the wheel begins to lock-up, the rate of change of deceleration of the wheels increases rapidly, and exceed the predetermined threshold voltage T of the threshold detecting circuit 297 which causes energization of the solenoid 310.

The solenoid exerts a force upon the member $213_1$ forcing it to the right (as viewed in FIG. 16) to open the exhaust valve $237_1$, thus rapidly reducing the supply pressure in the supply chamber $231_1$. As in the previously described embodiment, the reduction of supply pressure in chamber $231_1$ is conveyed to the sealed air chamber 146 on the power wall 124 of the booster through the air hose 154. This chamber in turn communicates through the passage of the booster control valve 134 defined between the air valve seats 170, 176 to the power chamber 136. The operation of the one-way check valve 270 is as previously described, and supplements the air valve passage to permit the rapid dumping of the air in the power chamber 136 through the hose 154 and the monitor valve to the source of vacuum, as the return force due to the hydraulic pressure in the brake lines and master cylinder means and the power booster will return spring 188 overcomes the reduced pressure differential across the power wall and return the power wall. The energization of the solenoid 310 moving the member 310 to the right has the effect of reducing the total braking force for a period sufficient to restore the tires in rolling contact with the road surface and to a slip ratio relative thereto (see FIG. 8) to the left of and below the peak of the coefficient of friction curve, as diagrammatically illustrated by the curved arrow Z.

A second signal ($\dot{a}_2$ on the signal diagrams of FIG. 17) indicating high rate of change of deceleration as the wheels approach vehicle velocity, switches the threshold detection circuit 297 to the "Off" condition, deenergizing the solenoid 310 and releasing the member 213₁ to permit the reestablishment of the differential between the air chamber and the power chamber, and upon continued application of the brake pedal causing the differential across the power wall to increase and thereby reapply the brakes. The cycle is repetitive tomodulate the braking forces about their maximum to produce maximum stopping force while preventing wheel lock-up.

While the invention has been described hereinabove in connection with an automotive power brake system utilizing a power booster, it will be appreciated that it is applicable to other types of power brake systems, such as central power hydraulic systems and air brake systems for vehicles such as buses and trucks, as well as automobiles.

Among the features of the invention which would be especially significant in connection with such other types of power brake systems is the operation of the deceleration responsive means to produce a force opposing the manual force supplied to operate the brake system as the braking force is modulated by the skid control means. This opposing force, in effect, overrides the manual force which may continue to be applied by the operator, so that the skid control function is fully achieved. In the previously described operation of a booster in the hydraulic system specifically disclosed herein, as the deceleration responsive means operates to modulate the differential pressure across the power wall of the booster to achieve skid control, force is applied to the power wall in the return direction by the fluid pressures in the master cylinder and brake lines, and by the return spring, tending to override the manual force applied by the operator to the brake pedal. The operator will feel this opposing force which tends to lift the brake pedal against his foot as he continues to apply the brake pedal to bring the vehicle to a stop.

It is also noted that when the expression "detecting vehicle deceleration" is used in the specification and claims, we mean detecting deceleration of the entire vehicle or of a wheel or wheels of the vehicle, as by the decelerometer 46 or the electronic wheel deceleration responsive device.

We claim as our invention:

1. In a hydraulic brake system for a vehicle having front and rear wheel brakes, the combination comprising, a power booster for assisting manual effort in operating said front and rear wheel brakes, a variable proportioning device in said hydraulic brake system including means for varying the ratio of front to rear braking forces as a substantially continuously varying, non-linear, predetermined function of tire-road coefficient of friction, which function approximately matches the non-linear function as defined by the Holland equation for $S_f/S_r$, and deceleration responsive means for detecting vehicle deceleration and for controlling said power booster in response to changes in deceleration reflecting a slip ratio at both front and rear wheels exceeding that corresponding to the peak value of tire-road coefficient of friction and return to rolling contact with the road to modulate the braking forces at both front and rear wheels about their maximum to maintain maximum vehicle deceleration without wheel lock-up.

2. The combination in a hydraulic system as defined in claim 1 wherein said power booster is a vacuum suspended power booster adapted to receive supply air at a modulated pressure, and said deceleration responsive means includes a valve for modulating the supply air pressure an thereby controlling said power booster in response to changes in deceleration.

3. The combination in a hydraulic brake system as defined in claim 2 wherein said deceleration responsive means includes signal generating means operated by said wheels, and circuit means operated by said generating means for deriving rate of change of wheel deceleration signals, and wherein said means for controlling said power booster includes means for modulating the output of said booster in response to varying rate of change signals reflecting changes in slip ratio at the wheels.

4. In an anti-skid hydraulic brake system for a vehicle having front and rear braking sub-systems, each sub-system being supplied with fluid pressure by master cylinder means and operable to apply braking forces to the front and rear wheels, respectively, of the vehicle, the combination comprising:

booster means for assisting a manual force applied to operate the braking system, the output of the booster means being connected to the master cylinder means;

a variable proportioning device in said hydraulic brake system including means for varying the ratio of fluid pressures in the front and rear brake sub-systems as a predetermined function of vehicle deceleration so as to achieve substantially the same slip ratio at the front wheels as at the rear wheels under any tire-road coefficient of friction condition, said proportioning device means being adjustable to compensate for changes in vehicle loading, and means for controlling said booster means including means for detecting changes in vehicle deceleration, the controlling means being adapted to
  i. vary the booster means output in response to the applied manual force during normal brake application resulting in braking forces producing a slip ratio less than that corresponding to the peak value of tire-road coefficient of friction, and to
  ii. reduce the booster means output to reduce braking forces in response to decreases in deceleration reflecting a slip ratio at both front and rear wheels exceeding that corresponding to the peak value of tire-road coefficient of friction, notwithstanding continued manual force being applied.

5. In an anti-skid hydraulic brake system for a vehicle having front and rear wheel braking sub-systems, each sub-system being supplied with pressure fluid by power means and operable to apply braking forces to the front and rear wheels, respectively, of the vehicle, the combination comprising:

manually operated control means for controlling the output of said power means in response to applied manual force and thereby the fluid pressure in said sub-systems, a variable proportioning device in said hydraulic brake system including means for varying the ratio of fluid pressures in the front and rear brake sub-systems as a predetermined function of vehicle deceleration so as to achieve substantially the same slip ratio at the front wheels as at the rear wheels under any tire-road coefficient of friction condition, said proportioning device means being adjustable to compensate for changes in vehicle loading, and vehicle deceleration responsive means operable independently of and in conjunction with said manually operated control means for controlling said power means,
i. to vary the output of said power means in response to the applied manual force during normal brake application resulting in braking forces producing a slip ratio less than that corresponding to the peak value of tire-road coefficient of friction,
ii. to reduce the output of said power means to reduce braking forces in response to decreases in deceleration reflecting a slip ratio at both front and rear wheels exceeding that corresponding to the peak value of tire-road coefficient of friction, notwithstanding continued manual force being applied,
iii. to reapply the output of said power means after rolling contact is reestablished between the tires and road, and
iv. to repeat the cycle of events (ii) and (iii) until the vehicle is stopped.

6. The combination in an anti-skid hydraulic brake system as defined in claim 5 wherein said power means is a booster for assisting manual force applied to operate the braking system and said variable proportioning device in said hydraulic brake system is operable to vary the ratio of fluid pressures in the front and rear brake sub-systems and the ratio of braking forces produced thereby as a non-linear, predetermined function of vehicle deceleration, which function approximately matches in non-linear function as defined by the Holland equation for $S_f/S_r$.

7. In a hydraulic brake system for a wheel vehicle having front and rear wheel brakes, the combination comprising, a power booster for assisting manual effort in operating said front and rear wheel brakes,
a variable proportioning device in said hydraulic brake system including means for varying the ratio of fluid pressures in the front and rear brakes as a predetermined function of tire-road coefficient of friction, which function approximately matches the Holland equation for $S_f/S_r$, said means being adjustable to compensate for changes in vehicle loading, and
deceleration responsive means for detecting vehicle deceleration and for controlling said power booster in response to changes in deceleration reflecting impending wheel lock-up and return to rolling contact with the road to modulate the braking forces at both front and rear wheels about their maximum to maintain maximum vehicle deceleration without wheel lock-up.

8. In an anti-skid hydraulic brake system for a vehicle having fornt and rear wheel braking sub-systems, each sub-system being supplied with fluid pressure by master cylinder means and operable to apply braking forces to the front and rear wheels, respectively, of the vehicle, a power booster for producing an output force to operate said master cylinder means, said power booster having a power wall operable by a differential pressure across said wall to produce said output force, and manually operated valve means for controlling the differential pressure across said power wall and thereby controlling the output force produced by said booster, the combination comprising:

a variable proportioning device in said hydraulic brake system including means for varying the ratio of fluid pressures in said front and rear braking sub-systems and for varying the ratio of braking forces produced thereby as a substantially continuously varying, predetermined function of tire-road coefficient of friction, which function approximately matches the non-linear function as defined by the Holland equation for $S_f/S_r$, so that when said brake system is operated substantially at braking forces where wheel lock-up is impending the braking forces applied to the front and rear wheels will produce substantially maximum vehicle deceleration under any given tire-road coefficient of friction and all wheels will begin to slip toward lock-up substantially simultaneously, and a deceleration responsive control means for detecting vehicle deceleration and responsive to predetermined changes in deceleration reflecting wheel slip toward lock-up, acting in conjunction with said manually operated valve means for modulating the differential pressure across said power wall to modulate the output force produced by said booster and the braking forces at both front and rear wheels about their maximum to maintain substantially maximum vehicle deceleration while preventing wheel lock-up.

9. In a hydraulic brake system for a vehicle, having front and rear wheel braking sub-systems, each sub-system being supplied with fluid pressure by manually operated master cylinder means and operable to apply braking forces to the front and rear wheels respectively, the combination comprising:

a vacuum suspended power booster for assisting manual effort applied to operate said master cylinder means, said power booster having a power wall,
a variable proportioning device in said hyalyic brake system including means for varying the ratio of fluid pressures in the front and rear brake sub-systems and for varying the ratio of braking forces produced thereby as a substantially continuously varying, non-linear, predetermined function of tire-road coefficient of friction, which function approximately matches the non-linear function as defined by the Holland equation for $S_f/S_r$, so as to produce substantially maximum deceleration under various tire-road conditions,
and means for controlling the differential pressure across the power wall of said booster including a manually operated booster control valve and deceleration responsive means having a valve for controlling the air supply to said booster control valve responsive to sudden decreases in deceleration reflecting impending wheel lock-up to prevent such lock-up while permitting said manually operated booster control valve to control said differential pressure upon gradual changes in deceleration.

10. In a brake system for a vehicle having front and rear wheels, tires on said wheels, and front and rear wheel brakes, the combination comprising, manually operated means for actuating said brakes to produce front and rear braking forces, distribution means in said system including means for varying the ratio of front to rear braking forces as a substantially continuously varying non-linear predetermined function of tire-road coefficient of friction, which function approximately matches the non-linear function as defined by the Holland equation for $S_f/S_r$, so as to apply the maximum braking forces that the tires are capable of exerting on the road at different tire-road coefficient of friction conditions so that both front and rear wheels will slip toward lock-up substantially simultaneously, and means responsive to vehicle deceleration for opposing the operation of said manually operated means when said deceleration responsive means indicates an impending wheel lock-up condition to prevent wheel lock-up.

11. In a hydraulic brake system for a vehicle having front and rear wheels, tires on said wheels, and front and rear wheel brakes, the combination comprising, manually operated power means for actuating said brakes to produce front and rear braking forces, distribution means in said hydraulic system including means for varying the ratio of front to rear braking forces as a predetermined function of vehicle deceleration so as to achieve substantially the same tire-road coefficient of friction at the front wheels as at the rear wheels under any tire-road condition, such that at any tire-road condition both front and rear wheels will slip toward lock-up substantially simultaneously, and means responsive to vehicle deceleration for overriding the continued manual operation of said power means and reducing the output thereof to reduce braking forces when said deceleration responsive means senses reduced deceleration reflecting an impending wheel lock-up condition, to prevent wheel lock-up.

12. In a hydraulic brake system for a vehicle having front and rear wheel brakes, the combination comprising, a power booster for assisting manual force in operating said front and rear wheel brakes to produce vehicle braking forces, said power booster having a power wall operable by a differential pressure across said wall, a variable proportioning device in said hydraulic brake system including means for varying the ratio of front to rear braking forces as a non-linear predetermined function of tire-road coefficient of friction which function approximately matches the Holland equation for $S_f/S_r$, and adjustable to compensate for changes in vehicle loading so that when said brakes are operated susbstantially at the skid-point where wheel lock-up is impending all wheels will tend to slip toward wheel lock-up simultaneously under any tire-road coefficient of friction condition, and deceleration responsive means for modulating the braking forces about the skid point by controlling the differential pressure across the power wall of said booster notwithstanding continued manual force being applied, to maintain vehicle deceleration while preventing wheel lock-up.

13. In an anti-skid hydraulic brake system for a vehicle having front and rear wheel braking sub-systems, each sub-system being supplied with fluid pressure by master cylinder means and operable to apply braking forces to the front and rear wheels, respectively, of the vehicle, the combination comprising:

a power unit producing an output force to operate said master cylinder means, said power unit having a power wall operable by a differential pressure across said wall and connected to said master cylinder means, manually operated valve means for controlling the differential pressure across said power wall and thereby controlling the output force produced by said power unit, a variable proportioning device in said hydraulic brake system including means for varying the ratio of fluid pressures in said front and rear braking sub-systems so as to vary the ratio of braking forces as a predetermined function of vehicle deceleration, which function approximately matches the function defined by the Holland equation for $S_f/S_r$, to achieve susbstantially the same tire-road coefficient of friction at the front as at the rear under any tire-road coefficient of friction condition, and means for detecting vehicle deceleration and responsive to predetermined changes in deceleration reflecting wheel slip toward lock-up, acting in conjunction with said manually operated valve means for modulating the differential pressure across said power wall to prevent wheel lock-up.

14. In a hydraulic brake system for a vehicle having front and rear wheel brakes, the combination comprising:

a power unit having a movable power wall operable by a variable differential pressure across the wall for producing power force which acts through hydraulic pressure to apply said wheel brakes, said power unit including a manually actuated control valve connected to two fluid pressure sources for modulating the differential pressure across said power wall by selective connection to said sources, a variable proportioning device including means for controlling said hydraulic pressure to vary the ratio of front to rear braking forces applied to the wheels by the wheel brakes as a predetermined function of vehicle deceleration so as to produce substantially the same tire-road coefficient of friction at both front and rear under any tire-road condition, and achieve maximum vehicle deceleration when said wheel brakes apply braking force which produces slip ratios corresponding to the peak tire-road coefficient of friction concurrently at both front and rear, and deceleration responsive means including a valve for modulating the supply pressure to said power unit control valve from one of said fluid pressure sources as a function of vehicle deceleration, and for controlling said power unit to cyclically reduce and increase the power force produced thereby and the resulting braking force in response to changes in deceleration reflecting slip ratios at both front and rear exceeding that corresponding to the peak tire-road coefficient of friction and return to rolling contact with the road, to maintain maximum vehicle deceleration without wheel lock-up.

15. In a hydraulic brake system, the combination according to claim 14 wherein said power unit includes a power chamber on one side of said power wall, said control valve is operable to modulate the pressure in the power chamber by selective connection to said fluid pressure sources, and said deceleration responsive means is operable to maintain the supply pressure from said one source at a substantially constant differential lead pressure relative to the power chamber pressure over an initial range of operation of the power unit up to the point where braking force produces slip ratios substantially at the peak tire-road coefficient of friction concurrently at both front and rear, and is operable to cyclically change said supply pressure and the power chamber pressure to cause the power unit to cyclically reduce and increase the power force and the resulting braking force in response to changes in deceleration reflecting slip ratios past the peak tire-road coefficient of friction and return to rolling contact with the road, to maintain maximum vehicle deceleration without wheel lock-up.

16. The combination in a hydraulic system as defined in claim 15 for an automotive vehicle wherein said power unit comprises a vacuum suspended power booster, said two fluid pressure sources comprise air and vacuum from the intake manifold of the vehicle engine, respectively, and the air supply pressure is modulated by said deceleration responsive means valve.

17. In a hydraulic brake system, the combination according to claim 15 wherein said power unit is a vacuum suspended power booster, said two fluid pressure sources comprise a source of air at atmospheric pressure and a source of vacuum, and said deceleration responsive means modulates the air supply pressure to said manually actuated control valve as a function of vehicle deceleration to maintain the air supply pressure at a substantially constant differential lead pressure greater than the power chamber pressure over said initial range of operation of the power unit, and is operable to reduce said air supply pressure below said power chamber pressure and to increase the air supply pressure above the power chamber pressure cyclically in repsonse to change in deceleration reflecting slip ratios past the peak tire-road coefficient of friction and return to rolling contact with the road to cause the power unit to cyclically reduce and increase the power force and the resulting braking force, to maintain maximum vehicle deceleration without lock-up.

* * * * *